United States Patent
Smith et al.

(10) Patent No.: US 12,366,856 B2
(45) Date of Patent: Jul. 22, 2025

(54) SYSTEMS AND METHODS FOR AUTOMATED OPERATION AND HANDLING OF AUTONOMOUS TRUCKS AND TRAILERS HAULED THEREBY

(71) Applicant: Outrider Technologies, Inc., Brighton, CO (US)

(72) Inventors: Andrew F. Smith, Bend, OR (US); Lawrence S. Klein, Bend, OR (US); Stephen A. Langenderfer, Bend, OR (US); Martin E. Sotola, Boulder, CO (US); Vikas Bahl, Highlands Ranch, CO (US); Mark H. Rosenblum, Denver, CO (US); Peter James, Denver, CO (US); Dale Dee Rowley, Highlands Ranch, CO (US); Matthew S. Johannes, Arvada, CO (US); Gary Michael Seminara, Golden, CO (US); Jeremy M. Nett, Littleton, CO (US)

(73) Assignee: Outrider Technologies, Inc., Brighton, MA (US)

( * ) Notice: Subject to any disclaimer, the term of this patent is extended or adjusted under 35 U.S.C. 154(b) by 0 days.

(21) Appl. No.: 18/675,969

(22) Filed: May 28, 2024

(65) Prior Publication Data
US 2024/0402703 A1    Dec. 5, 2024

Related U.S. Application Data

(62) Division of application No. 16/282,290, filed on Feb. 21, 2019, now Pat. No. 11,994,857.
(Continued)

(51) Int. Cl.
B62D 13/06    (2006.01)
B25J 9/16     (2006.01)
(Continued)

(52) U.S. Cl.
CPC .......... *G05D 1/0061* (2013.01); *B25J 9/1679* (2013.01); *B60D 1/015* (2013.01);
(Continued)

(58) Field of Classification Search
CPC .......... B25J 9/1679; B60D 1/015; B60D 1/26; B60D 1/36; B60D 1/62; B60D 1/64;
(Continued)

(56) References Cited

U.S. PATENT DOCUMENTS 3,881,748 A    5/1975  Donaldson
4,366,965 A    1/1983  Rhodes
(Continued)

FOREIGN PATENT DOCUMENTS

CA    2555212 A1    9/2005
CN    106741239    5/2017
(Continued)

OTHER PUBLICATIONS

'Re: Adapting the gladhand to an airhose'. In Steel Soldiers Military Vehicles Supersite Forums [online], Nov. 24, 2008 [ retrieved on Nov. 4, 2020], Retrieved from the Internet: <https://www.steelsoldiers.com/threads/adapting-the-gladhand-to-an-airhose ,28023/post-292796>. 5 pages. (Year: 2008).
(Continued)

*Primary Examiner* — Wade Miles
*Assistant Examiner* — Zachary Joseph Wallace
(74) *Attorney, Agent, or Firm* — Loginov & Associates, PLLC; William A. Loginov

(57) ABSTRACT

A system and method for operation of an autonomous vehicle (AV) yard truck is provided. A processor facilitates autonomous movement of the AV yard truck, and connection to and disconnection from trailers. A plurality of sensors are interconnected with the processor that sense terrain/objects and assist in automatically connecting/disconnecting trail-
(Continued)

ers. A server, interconnected, wirelessly with the processor, that tracks movement of the truck around and determines locations for trailer connection and disconnection. A door station unlatches/opens rear doors of the trailer when adjacent thereto, securing them in an opened position via clamps, etc. The system computes a height of the trailer, and/or if landing gear of the trailer is on the ground and interoperates with the fifth wheel to change height, and whether docking is safe, allowing a user to take manual control, and optimum charge time(s). Reversing sensors/safety, automated chocking, and intermodal container organization are also provided.

13 Claims, 35 Drawing Sheets

Related U.S. Application Data

(60) Provisional application No. 62/715,757, filed on Aug. 7, 2018, provisional application No. 62/681,044, filed on Jun. 5, 2018, provisional application No. 62/633,185, filed on Feb. 21, 2018.

(51) Int. Cl.

| | |
|---|---|
| *B60D 1/01* | (2006.01) |
| *B60D 1/26* | (2006.01) |
| *B60D 1/62* | (2006.01) |
| *B60D 1/64* | (2006.01) |
| *B60L 53/36* | (2019.01) |
| *B60L 58/12* | (2019.01) |
| *B60R 1/00* | (2022.01) |
| *B60R 25/04* | (2013.01) |
| *B60R 25/102* | (2013.01) |
| *B60R 25/23* | (2013.01) |
| *B60R 25/25* | (2013.01) |
| *B60W 60/00* | (2020.01) |
| *B62D 15/02* | (2006.01) |
| *B62D 33/02* | (2006.01) |
| *B62D 53/08* | (2006.01) |
| *B62D 53/12* | (2006.01) |
| *B65G 69/00* | (2006.01) |
| *E05B 81/54* | (2014.01) |
| *E05C 17/02* | (2006.01) |
| *G05D 1/00* | (2024.01) |
| *G05D 1/247* | (2024.01) |
| *G05D 1/249* | (2024.01) |
| *G05D 1/661* | (2024.01) |
| *G05D 1/81* | (2024.01) |
| *B62D 63/08* | (2006.01) |

(52) U.S. Cl.
CPC ............... *B60D 1/26* (2013.01); *B60D 1/62* (2013.01); *B60D 1/64* (2013.01); *B60L 53/36* (2019.02); *B60L 58/12* (2019.02); *B60R 1/003* (2013.01); *B60R 25/04* (2013.01); *B60R 25/102* (2013.01); *B60R 25/23* (2013.01); *B60R 25/25* (2013.01); *B60W 60/0025* (2020.02); *B62D 13/06* (2013.01); *B62D 15/0285* (2013.01); *B62D 33/0222* (2013.01); *B62D 53/0821* (2013.01); *B62D 53/12* (2013.01); *B65G 69/005* (2013.01); *E05B 81/54* (2013.01); *E05C 17/02* (2013.01); *G05D 1/0088* (2013.01); *G05D 1/0225* (2013.01); *G05D 1/0231* (2013.01); *G05D 1/0276* (2013.01); *G05D 1/247* (2024.01); *G05D 1/249* (2024.01); *G05D 1/661* (2024.01); *G05D 1/81* (2024.01); *B60L 2200/36* (2013.01); *B62D 63/08* (2013.01); *E05Y 2900/516* (2013.01); *E05Y 2900/531* (2013.01)

(58) Field of Classification Search
CPC ...... B60L 2200/36; B60L 53/36; B60R 1/003; B60R 25/102; B62D 15/0285; B62D 33/0222; B62D 53/125; B62D 53/12; B62D 63/08; B65G 69/003; E05Y 2900/516; E05Y 2900/531; G05D 1/0225; G05D 1/249
See application file for complete search history.

(56) References Cited

U.S. PATENT DOCUMENTS

| | | |
|---|---|---|
| 4,448,447 A | 5/1984 | Funk |
| 4,548,783 A | 10/1985 | Dalke |
| 5,305,427 A | 4/1994 | Nagata |
| 5,607,221 A | 3/1997 | Justus |
| 6,179,319 B1 | 1/2001 | Malisch |
| 6,863,538 B2 | 3/2005 | Mattern |
| 7,562,918 B2 | 7/2009 | Toma |
| 7,669,875 B2 | 3/2010 | Halverson |
| 7,748,549 B1 | 7/2010 | Browning |
| 8,187,020 B2 | 5/2012 | Algueera Gallego |
| 8,301,318 B2 | 10/2012 | Lacaze |
| 8,532,862 B2 | 9/2013 | Neff |
| 8,727,084 B1 | 5/2014 | Kuker |
| 8,806,689 B2 | 8/2014 | Riviere |
| 8,888,121 B2 | 11/2014 | Trevino |
| 9,068,668 B2 | 6/2015 | Grover |
| 9,211,889 B1 | 12/2015 | Hoetzer |
| 9,302,678 B2 | 4/2016 | Murphy |
| 9,592,964 B2 | 3/2017 | Göllü |
| 9,688,489 B1* | 6/2017 | Zevenbergen ........... B25J 11/00 |
| 10,081,504 B2 | 9/2018 | Walford |
| 10,399,477 B2* | 9/2019 | Obermeyer ............... B60P 1/43 |
| 10,556,473 B2 | 2/2020 | Strand |
| 11,099,560 B2 | 8/2021 | Smith |
| 11,429,099 B2 | 8/2022 | Smith |
| 11,560,188 B2 | 1/2023 | Moore |
| 11,834,111 B2 | 12/2023 | Moore |
| 2003/0233189 A1 | 12/2003 | Hsiao |
| 2004/0146384 A1 | 7/2004 | Whelan |
| 2005/0017506 A1 | 1/2005 | Caldwell |
| 2005/0103541 A1 | 5/2005 | Nelson |
| 2006/0071447 A1 | 4/2006 | Gehring |
| 2007/0030349 A1 | 2/2007 | Riley |
| 2008/0012695 A1 | 1/2008 | Herschell |
| 2008/0223630 A1 | 9/2008 | Couture |
| 2008/0262654 A1 | 10/2008 | Omori |
| 2010/0025964 A1 | 2/2010 | Fisk |
| 2011/0037241 A1 | 2/2011 | Temple |
| 2011/0254504 A1 | 10/2011 | Haddad |
| 2012/0248167 A1 | 10/2012 | Flanagan |
| 2014/0007386 A1 | 1/2014 | Liao |
| 2014/0251556 A1 | 9/2014 | Orton |
| 2014/0268095 A1 | 9/2014 | Petkov |
| 2015/0251366 A1 | 9/2015 | Voth |
| 2015/0258908 A1 | 9/2015 | Fukui |
| 2015/0263541 A1 | 9/2015 | Fukui |
| 2015/0328655 A1 | 11/2015 | Reichler |
| 2015/0352721 A1* | 12/2015 | Wicks ..................... G06V 20/10 |
| | | 700/228 |
| 2015/0360882 A1* | 12/2015 | Girtman ................... B25J 11/00 |
| | | 414/796.5 |
| 2016/0039456 A1 | 2/2016 | Lavoie |
| 2016/0054143 A1 | 2/2016 | Abuelsaad |
| 2016/0075526 A1 | 3/2016 | Avalos |
| 2016/0260328 A1 | 9/2016 | Mishra |
| 2016/0304122 A1 | 10/2016 | Herzog |
| 2016/0318490 A1 | 11/2016 | Ben Shalom |
| 2017/0031356 A1 | 2/2017 | Bell |
| 2017/0050526 A1 | 2/2017 | Sommarström |

(56) References Cited

U.S. PATENT DOCUMENTS

| | | |
|---|---|---|
| 2017/0146168 A1 | 5/2017 | Caprio |
| 2017/0165839 A1 | 6/2017 | Tan |
| 2017/0174019 A1 | 6/2017 | Lurie |
| 2017/0185082 A1 | 6/2017 | Matos |
| 2017/0186124 A1 | 6/2017 | Jones |
| 2017/0305694 A1 | 10/2017 | McMurrough |
| 2017/0361844 A1 | 12/2017 | Kahn |
| 2017/0364070 A1 | 12/2017 | Oba |
| 2017/0369260 A1 | 12/2017 | Hoofard |
| 2018/0050573 A1 | 2/2018 | Strand |
| 2018/0202822 A1 | 7/2018 | Delizio |
| 2018/0250833 A1 | 9/2018 | Boria |
| 2018/0264963 A1 | 9/2018 | Dudar |
| 2018/0265076 A1 | 9/2018 | Hall |
| 2018/0265296 A1* | 9/2018 | Beckman ............... B64U 70/90 |
| 2018/0281178 A1* | 10/2018 | Jacobsen ............... B25J 13/086 |
| 2018/0346029 A1* | 12/2018 | Kabos ............... B62D 15/029 |
| 2018/0362270 A1* | 12/2018 | Clucas ............... B25J 5/00 |
| 2019/0002216 A1 | 1/2019 | Walford |
| 2019/0064828 A1 | 2/2019 | Meredith |
| 2019/0064835 A1 | 2/2019 | Hoofard |
| 2019/0077600 A1 | 3/2019 | Watts |
| 2019/0095861 A1 | 3/2019 | Baldwin |
| 2019/0129429 A1 | 5/2019 | Juelsgaard |
| 2019/0187716 A1 | 6/2019 | Cantrell |
| 2019/0197786 A1 | 6/2019 | Molyneaux |
| 2019/0235504 A1 | 8/2019 | Carter |
| 2020/0239242 A1* | 7/2020 | Hoofard ............... G05D 1/622 |
| 2020/0338942 A1 | 10/2020 | Winograd |
| 2020/0387166 A1 | 12/2020 | Lacaze |
| 2020/0387168 A1 | 12/2020 | Lacaze |
| 2021/0053407 A1 | 2/2021 | Smith |
| 2021/0061034 A1 | 3/2021 | Moore |
| 2021/0061304 A1 | 3/2021 | Braunstein |
| 2021/0141384 A1 | 5/2021 | Lacaze |
| 2021/0192784 A1 | 6/2021 | Taylor |
| 2021/0238908 A1* | 8/2021 | Ramage ............... E05F 15/686 |
| 2021/0316761 A1 | 10/2021 | Torrie |
| 2021/0380182 A1 | 12/2021 | Delizo |
| 2022/0080584 A1 | 3/2022 | Wicks |
| 2022/0371199 A1 | 11/2022 | Schultz |
| 2023/0391243 A1* | 12/2023 | Duong ............... B60P 3/14 |
| 2024/0043075 A1 | 2/2024 | Johannes |
| 2024/0294044 A1 | 9/2024 | Lacaze |

FOREIGN PATENT DOCUMENTS

| | | |
|---|---|---|
| CN | 107380002 | 11/2017 |
| DE | 102012102648 B4 | 9/2012 |
| DE | 102012023999 A1 | 1/2014 |
| EP | 2886497 B1 | 6/2015 |
| JP | S5885702 A | 5/1983 |
| JP | 3215916 B2 | 10/2001 |
| WO | 2010118420 A2 | 10/2010 |
| WO | 2013180622 A1 | 12/2013 |
| WO | 2016205559 A1 | 12/2016 |
| WO | 2017100716 A1 | 6/2017 |
| WO | 2018001915 A1 | 1/2018 |
| WO | 2019042958 A1 | 3/2019 |
| WO | 2019046383 A1 | 3/2019 |
| WO | 2019118848 A1 | 6/2019 |

OTHER PUBLICATIONS

Bennett, Sean. Modern Diesel Technology: Brakes, Suspension & Steering. New York, Delmar, 2007. pp. 53-54. ISBN-10: 1-4180-1372-2. (Year: 2007).

Fuchs C et al: "3D pose estimation for articulated vehicles using Kalman-filter based tracking", Pattern Recognition. Image Analysis, Allen Press, Lawrence, KS, US, vol. 26, No. 1, Jul. 23, 2016 (Jul. 23, 2016), pp. 109-113, XP036013102, ISSN: 1054-6618, DOI: 10.1134/S1054661816010077 [retrieved on Jul. 23, 2016].

Tofael Ahamed: "Navigation of an Autonomous Tractor Using Multiple Sensors", Thesis, Feb. 22, 2008 (Feb. 22, 2008), XP055527539, Retrieved from the Internet: URL:https://tsukuba.repo.nii.ac.jp/?action =repository action common download&item id=20956 &item- -no=1&attribute- id=17&file- no=2 [retrieved on Nov. 27, 2018] 183 pages, Chapter 9.

* cited by examiner

SYSTEMS AND METHODS FOR AUTOMATED OPERATION AND HANDLING OF AUTONOMOUS TRUCKS AND TRAILERS HAULED THEREBY

RELATED APPLICATION

This application is a divisional of co-pending U.S. patent application Ser. No. 16/282,290, entitled SYSTEMS AND METHODS FOR AUTOMATED OPERATION AND HANDLING OF AUTONOMOUS TRUCKS AND TRAILERS HAULED THEREBY, filed Feb. 21, 2019, which claims the benefit of U.S. Provisional Application Ser. No. 62/633,185, entitled SYSTEMS AND METHODS FOR AUTOMATED OPERATION AND HANDLING OF AUTONOMOUS TRUCKS AND TRAILERS HAULED THEREBY, filed Feb. 21, 2018, U.S. Provisional Application Ser. No. 62/681,044, entitled SYSTEMS AND METHODS FOR AUTOMATED OPERATION AND HANDLING OF AUTONOMOUS TRUCKS AND TRAILERS HAULED THEREBY, filed Jun. 5, 2018, and U.S. Provisional Application Ser. No. 62/715,757, entitled SYSTEMS AND METHODS FOR AUTOMATED OPERATION AND HANDLING OF AUTONOMOUS TRUCKS AND TRAILERS HAULED THEREBY, filed Aug. 7, 2018, the entire disclosure of each of which applications is herein incorporated by reference.

FIELD OF THE INVENTION

This invention relates to autonomous vehicles and more particularly to autonomous trucks and trailers therefor, and docking thereof, for example, as used to haul cargo around a shipping facility, a production facility or yard, or to transport cargo to and from a shipping facility, a production facility or yard.

BACKGROUND OF THE INVENTION

Trucks are an essential part of modern commerce. These trucks transport materials and finished goods across the continent within their large interior spaces. Such goods are loaded and unloaded at various facilities that can include manufacturers, ports, distributors, retailers, and end users. Large over-the road (OTR) trucks typically consist of a tractor or cab unit and a separate detachable trailer that is interconnected removably to the cab via a hitching system that consists of a so-called fifth wheel and a kingpin. More particularly, the trailer contains a kingpin along its bottom front and the cab contains a fifth wheel, consisting of a pad and a receiving slot for the kingpin. When connected, the kingpin rides in the slot of the fifth wheel in a manner that allows axial pivoting of the trailer with respect to the cab as it traverses curves on the road. The cab provides power (through (e.g.) a generator, pneumatic pressure source, etc.) used to operate both itself and the attached trailer. Thus, a plurality of removable connections are made between the cab and trailer to deliver both electric power and pneumatic pressure. The pressure is used to operate emergency and service brakes, typically in conjunction with the cab's own (respective) brake system. The electrical power is used to power (e.g.) interior lighting, exterior signal and running lights, lift gate motors, landing gear motors (if fitted), etc.

Throughout the era of modern transport trucking, the connection of such electrical and pneumatic lines, the raising and lowering of landing gear, the operation of rear swing doors associated with trailers, and vehicle inspections have been tasks that have typically been performed manually by a driver. For example, when connecting to a trailer with the cab, after having backed into the trailer so as to couple the truck's fifth wheel to the trailer's kingpin, these operations all require a driver to then exit his or her cab. More particularly, a driver must crank the landing gear to drop the kingpin into full engagement with the fifth wheel, climb onto the back of the cab chassis to manually grasp a set of extendable hoses and cables (carrying air and electric power) from the rear of the cab, and affix them to a corresponding set onto related connections at the front of the trailer body. This process is reversed when uncoupling the trailer from the cab. That is, the operator must climb up and disconnect the hoses/cables, placing them in a proper location, and then crank down the landing gear to raise the kingpin out of engagement with the fifth wheel. Assuming the trailer is to be unloaded (e.g. after backing it into a loading dock), the driver also walks to the rear of the trailer to unlatch the trailer swing doors, rotate them back 270 degrees, and (typically) affix each door to the side of the trailer. With some trailer variations, rear doors are rolled up (rather than swung), and/or other action is taken to allow access to cargo. Other facilities, such as loading dock warning systems, chocks which prevent trailers from rolling unexpectedly and trailer-to-dock locking mechanisms rely upon human activation and monitoring to ensure proper function and safety. Similar safety concerns exist when trucks and trailers are backing up, as they exhibit a substantial blind spot due to their long length and large width and height.

Further challenges in trucking relate to intermodal operations, where yard trucks are used to ferry containers between various transportation modalities. More particularly, containers must be moved between railcars and trailers in a railyard in a particular order and orientation (front-to-rear facing, with doors at the rear). Likewise, order and orientation is a concern in dockyard operations where containers are removed from a ship.

A wide range of solutions have been proposed over the years to automate one or more of the above processes, thereby reducing the labor needed by the driver. However, no matter how effective such solutions have appeared in theory, the trucking industry still relies upon the above-described manual approach(es) to connecting and disconnecting a trailer to/from a truck tractor/cab.

With the advent of autonomous vehicles, it is desirable to provide further automation of a variety of functions that have been provided manually out of tradition or reasonable convenience.

SUMMARY OF THE INVENTION

This invention overcomes disadvantages of the prior art by providing systems and methods for connecting and disconnecting trailers from truck cabs (tractors) that enhance the overall automation of the process and reduce the need for human intervention therewith. These systems and methods are particularly desirable for use in an autonomous trucking environment, such as a shipping yard, port, manufacturing center, fulfillment center and/or general warehouse complex, where the operational range and routes taken by hauling vehicles are limited and a high density of are moved into, out of and around the facility. Such trailers typically originate from, and are dispatched to, locations using over-the-road cabs or trucks (that can be powered by diesel, gasoline, compressed gas other internal-combustion-based fuels, and/ or electricity in a plug-in-charged and/or fuel/electric hybrid arrangement). Cabs or trucks within the facility (termed "yard trucks") can be powered by electricity or another desirable (e.g. internal combustion) fuel source-which can be, but is not limited to, clean-burning fuel, in various implementations.

In order to facilitate substantially autonomous operation of yard trucks (herein referred to as "autonomous vehicle", or "AV" yard trucks), as well as other AV trucks and hauling vehicles, various systems are automated. The systems and methods herein address such automation. By way of non-limiting example, the operation of hitching, including the connection of brake/electrical service to a trailer by the truck is automated. Additionally, unlatching and opening of trailer (e.g. swing) doors is automated. Identification of trailers in a yard and navigation with respect to such trailers is automated, and safety mechanisms and operations when docking and undocking a trailer are automated. Access to the truck by a user can be controlled, and safety tests can be performed in an automated manner-including but not limited to a tug test that ensures a secure hitch. Likewise, the raising of the fifth wheel and verification that the trailer landing gear has disengaged the ground is automated.

In an embodiment, connection of at least the emergency brake pneumatic lines is facilitated by an interengaging connection structure that consists of a cab-mounted, conical or tapered guide structure located on the distal end of a manipulator or extension and a base connector located on the front face/wall of the trailer body having a corresponding receptacle shaped and arranged to center and register the cab guide structure so that, when fully engaged, the air connection between the cab and the trailer is complete and (at least) the emergency brakes can be actuated via pressure delivered from the cab. In a further embodiment, the cab-mounted guide structure can be adapted to include one or more electrical connectors that engage to close the power circuit between the cab and trailer. The connection arrangement can also be adapted to interconnect the service brake lines between the cab and the trailer. The connection on the trailer can be provided using a mounting plate that is removably (or permanently) attached to the front of the trailer when it enters the facility using (e.g.) clamps that engage slots on the trailer bottom. Alternatively, an interengaging fabric (e.g. hook-and-loop, 3M Dual-Lock™), fasteners, magnetic sheet or buttons, etc., can be employed to removably fasten the connection plate. The plate includes the base connector and a hose with a fitting (e.g. a glad hand) adapted to engage a standard hose fitting on the trailer.

In another embodiment, a pneumatically or hydraulically extendable (telescoping) arm is affixed behind the cab of the yard truck on a linear actuator that allows lateral movement. In addition, a second smaller pneumatic/hydraulic piston is affixed to the base and the bottom of the larger arm, allowing the arm to raise and lower. At the end of the arm is a vertical pivot or wrist (for vertical alignment) with an electrically actuated gripping device or hand, that can hold (and retrieve) a coupling device which is deployed onto the trailer to a corresponding shaped receiving receptacle. The coupling devise also has one (or more) side-mounted air-hose(s) that deliver the air pressure from the yard truck for connection to the trailer. An integrated power (and communications line) is paired with the air-hose, allowing for the actuation of a collar (lock) on a standard hose fitting to pair the coupling device to the receiving receptacle. In addition, the electrical power that is delivered via the coupling devise could also provide power to the trailer systems (as described above). In order to assist with the arm's autonomous ranging and alignment, a camera and laser-ranging device are also mounted on the gripping mechanism or hand. Once the hand delivers the coupling device (with associated air-hose and electrical connection) to the receiving receptacle and a positive air connection is detected, the grip release is actuated and the coupling remains with the receiving receptacle, as the arm is retracted back towards the cab for trailer clearance purposes. The receiving receptacle on the trailer can be mounted in a preferred available location on the front face of the trailer by the use of an interengaging fabric tape or sheet-such as industrial grade hook-and-loop material and/or Dual-Lock™ recloseable fasteners, or similar (e.g. magnetic sheets), as a removably attached device when onsite (or permanently affixed). The receiving receptacle is also marked with an identifying bordering pattern that the associated ranging/locating software can use to orient the arm and align the coupling device.

In another embodiment, in place of the extendable arm and secondary piston, two additional linear actuators are mounted, in a cross-formation onto the base linear actuator, which now runs in orientation along the length of the truck's frame. This results in the ability of the three linear actuators to move, in-concert, in the orthogonal X, Y, and Z-axis dimensions. The linear actuator that is cross-mounted on the vertical linear actuator still retains the electrically actuated gripping device or hand, as described above.

A system and method for operation of an autonomous vehicle (AV) yard truck in a yard environment is provided. A processor facilitates autonomous movement of the AV yard truck, substantially free of human user control inputs to onboard controls of the truck. A plurality of sensors are interconnected with the processor that sense terrain and objects in the yard. A server (and/or yard management system (YMS)) is interconnected, wirelessly with the processor, and tracks movement of the AV yard truck around the yard, and determines locations. Illustratively, the processor and the server communicate with a door station for unlatching and opening rear doors of the trailer when adjacent thereto. The door station can include a clamping mechanism that removably maintains the rear doors in an open position when exiting the door station.

In an embodiment, the processor and the server can communicate with a dock-mounted safety system that indicates when movement of the trailer away from the dock is enabled. The processor and server thereby instruct the truck to move when indicated by the safety system. The safety system can comprise a multi-color signal light operatively connected with the server and the processor, and/or the truck can include a sensor that reads a state of the multi-color signal light. The safety system can also (or alternatively) comprise a locking mechanism that selectively engages a portion of the trailer when movement away from the dock is not enabled.

In an embodiment, a system and method for robotically opening rear swing doors of a trailer is provided. A framework is adapted to receive, adjacent thereto, a trailer rear. A member on the framework can move in a plurality of degrees of freedom in relation to the framework and trailer, and the member can include structures that are arranged to manipulate a door securing assembly on the trailer. A door opening assembly engages and swings the doors subsequent to unlocking, and an interface guides the framework and the door opening assembly remotely. A door-fixing assembly can retain each door in an open orientation after the trailer moves remote from the framework. Illustratively, the door opening assembly comprises at least one of a robotic arm assembly and a post assembly that move approximately vertically into and out of engagement with each of the doors, and moves along a path from a closed position and the open orientation. The posts can be movably mounted with respect to a slotted floor that allows each of the posts to track along a respective slot, defining the path. In an embodiment, the door-fixing assembly can comprise an end effector, operatively connected with the framework, which selectively applies a clip or clamp-like device over the door and a side of the trailer via a rear edge thereof in the open orientation. The interface can comprise a sensor assembly that views the rear of the trailer and a processor that causes the framework to move in response to control commands. Illustratively the processor includes at least one of (a) a human-machine-interface (HMI) control that allows a user to move the framework based on feedback received from the sensor assembly, and (b) an autonomous movement process that automatically moves the framework based on a trained pattern in response to the sensor assembly. The sensor assembly can also comprise a camera assembly and the autonomous movement process includes a vision system.

In an embodiment, a system and method for operating a truck in a yard is provided. An autonomous truck and hitched trailer responsive to an onboard processor and a remote server is provided. A dock-mounted safety system indicates when movement of the trailer away from the dock is enabled. The processor and server instruct the truck to move when indicated by the safety system. The safety system comprises a multi-color signal light operatively connected with the server and the processor. The truck can include a sensor that reads a state of the multi-color signal light. The safety system can also comprise a locking mechanism that selectively engages a portion of the trailer when movement away from the dock is not enabled.

In an embodiment, a system and method for retaining opened swing doors on a trailer includes a clip-like clamping device constructed and arranged to flex and frictionally pinch each opened swing door against a side of the trailer. The clamping device resides over a rear edge of the swing door and the side when in an attached orientation. The clamping device can define a pair of tines, with a gap therebetween, joined by a connecting base. The clamping device can be adapted to be slid robotically or manually over the rear edge, and/or the connecting base can include a structure that is selectively engaged by an end effector of a robot. Illustratively, the clamping device comprises a flexible material and defines a unitary construction between the tines and the connecting base. The geometry of the tines can vary (e.g. define a curve, polygonal or other shape) to facilitate flexure, clearance over structures on the door/trailer side, and/or enhance grip.

In an embodiment, a system and method for assisting reverse operations on a trailer hitched to an autonomous truck comprises an unmanned vehicle that is deployed with respect to a rear of the trailer and that images a space behind the trailer prior to and/or during a reversing motion. The unmanned vehicle can comprise at least one of an unmanned aerial vehicle (UAV), and an unmanned ground vehicle (UGV) that can be a robotic vehicle having a plurality of sensor types thereon and that tracks a perimeter of the trailer to locate a rear thereof. Illustratively, the sensor types can include forward looking sensors and upward looking sensors. The UGV can also be adapted to travel along a top of the roof of the trailer. A deployment mechanism on the truck can lift the UGV from a location on the truck, and place the UGV on the roof. The UGV can be arranged to travel with respect to a centerline of the roof. The UGV includes at least one of tracks and wheels that frictionally engage the roof.

In an embodiment, a system and method for assisting reverse operations on a trailer, hitched to an autonomous truck comprises a moving sensor assembly mounted on a linear guideway. The guideway is mounted laterally on a structure adjacent to a parking area for trailers to be received. The sensor assembly provides/transmits sensor data related to a space behind the trailer, which is employed by at least one of a facility control server for the autonomous truck and an on-board controller of the autonomous truck. The sensor assembly can include at least one of a vision system camera, LIDAR and radar, among other known visual and spatial sensor types. Illustratively, the guideway is mounted with respect to a loading dock and/or can comprise at least one of a rail, wire and track. The sensor assembly can move to a location in the structure in which the autonomous truck is operating, and the sensor assembly is constructed and arranged to provide the sensor data to a plurality of autonomous trucks when reversing, respectively, at that location in the structure.

In an embodiment, a system and method for automatically applying a jackstand to a trailer comprises a base mounted to a ground surface and a rotation mechanism that rotates a jackstand assembly from an orientation substantially flush with the ground surface to an upright orientation with jack pads confronting a bottom of the trailer. A pair of telescoping jackstand members move, in the upright orientation, from a retracted location beneath the bottom of the trailer to a deployed location that engages the bottom of the trailer, and thereby supplements and/or replaces the trailer's standard landing gear.

In an embodiment, a system and method for automated chocking of a trailer comprises a pair of pads having a predetermined length that is greater than a length of a wheel set of the trailer. The pads are secured to the ground and arranged/adapted for the trailer wheel sets to drive thereonto. An inflatable material selectively inflates to define a plurality of undulating surfaces that cradle the wheels of the wheel sets to resist rolling of the wheels. The inflatable material, conversely, enables free rolling of the wheels when deflated. Illustratively, the inflatable material can define a sawtooth cross section when inflated, with a series of substantially triangular teeth.

In an embodiment, a system and method for automated chocking of a trailer comprises a pair of manifold housings having a predetermined length that is greater than a length of a wheel set of the trailer. The housings are adapted for the wheel sets to drive therebetween with the manifold housings residing along each of opposing respective sides. A plurality of side-by-side inflatable tubes extend inwardly toward an adjacent one of the wheel sets. The fully extended tubes project across the wheels of the wheel sets to resist rolling thereof.

In an embodiment, a system and method for automated chocking of a trailer comprises a track that resides beneath the trailer; and a slider that moves along the track. A bar assembly selectively moves into and out of interference with a wheel set of the trailer when the slider moves the bar assembly along the track into proximity with the wheel set. The bar assembly can include a par of oppositely extending bar extensions that selectively lengthen to bar assembly from a width less than an inner width between the wheel sets and a width that is greater that the inner width. Alternatively, at least one of the bar assembly and the slider includes a rotation mechanism that rotates the bar between an elongated orientation substantially parallel to the track and a transverse orientation that extends across a path of travel of the wheel sets.

BRIEF DESCRIPTION OF THE DRAWINGS

The invention description below refers to the accompanying drawings, of which.

DETAILED DESCRIPTION

I. Overview

Figure 1:
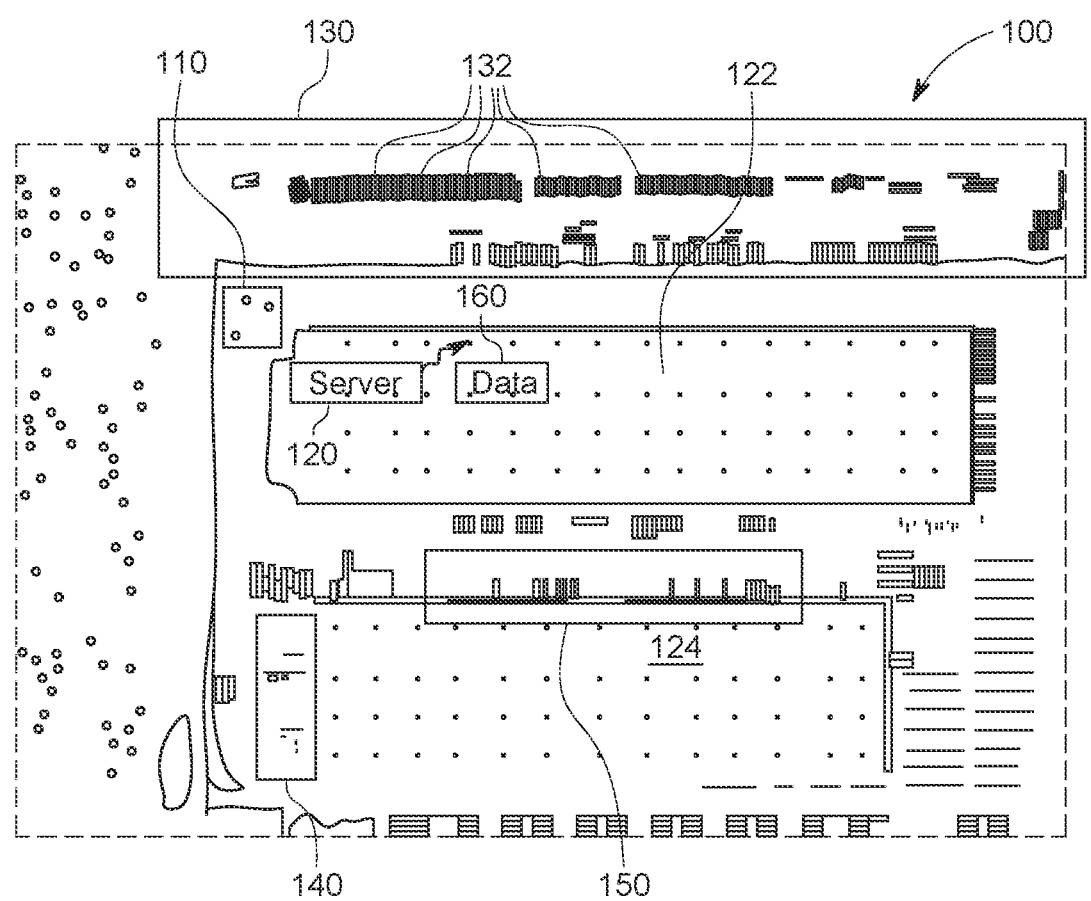
FIG. 1 is a diagram showing an aerial view of an exemplary shipping facility with locations for storing, loading and unloading trailers used in conjunction with the AV yard truck arrangements provided according to a system and method for handling trailers within a yard.

FIG. 1 shows an aerial view of an exemplary shipping facility 100, in which over-the-road (OTR) trucks (tractor trailers) deliver goods-laden trailers from remote locations and retrieve trailers for return to such locations (or elsewhere—such as a storage depot). In a standard operational procedure, the OTR transporter arrives with a trailer at a destination's guard shack (or similar facility entrance checkpoint) 110. The guard/attendant enters the trailer information (trailer number or QR (ID) code scan-imbedded information already in the system, which would typically include: trailer make/model/year/service connection location, etc.) into the facility software system, which is part of a server or other computing system 120, located offsite, or fully or partially within the facility building complex 122 and 124. The complex 122, 124 includes perimeter loading docks (located on one or more sides of the building), associated (typically elevated) cargo portals and doors, and floor storage, all arranged in a manner familiar to those of skill in shipping, logistics, and the like.

By way of a simplified operational example, after arrival of the OTR truck, the guard/attendant would then direct the driver to deliver the trailer to a specific numbered parking space in a designated staging area 130—shown herein as containing a large array of parked, side-by-side trailers 132, arranged as appropriate for the facility's overall layout. The trailer's data and parked status is generally updated in the company's integrated yard management system (YMS), which can reside of the server 120 or elsewhere.

Once the driver has dropped the trailer in the designated parking space of the staging area 130, he/she disconnects the service lines and ensures that connectors are in an accessible position (i.e. if adjustable/sealable). If the trailer is equipped with swing doors, this can also provide an opportunity for the driver to unlatch and clip trailer doors in the open position, if directed by yard personnel to do so.

At some later time, the (i.e. loaded) trailer in the staging area 130 is hitched to a yard truck/tractor, which, in the present application is arranged as an autonomous vehicle (AV). Thus, when the trailer is designated to be unloaded, the AV yard truck is dispatched to its marked parking space in order to retrieve the trailer. As the yard truck backs down to the trailer, it uses one or multiple mounted (e.g. a standard or custom, 2D grayscale or color-pixel, image sensor-based) cameras (and/or other associated (typically 3D/range-determining) sensors, such as GPS receiver(s), radar, LiDAR, stereo vision, time-of-flight cameras, ultrasonic/laser range finders, etc.) to assist in: (i) confirming the identity of the trailer through reading the trailer number or scanning a QR, bar, or other type of coded identifier; (ii) Aligning the truck's connectors with the corresponding trailer receptacles. Such connectors include, but are not limited to, the cab fifth (5th) wheel-to-trailer kingpin, pneumatic lines, and electrical leads. Optionally, during the pull-up and initial alignment period of the AV yard truck to the trailer, the cameras mounted on the yard truck can also be used to perform a trailer inspection, such as checking for damage, confirming tire inflation levels, and verifying other safety criteria.

The hitched trailer is hauled by the AV yard truck to an unloading area 140 of the facility 124. It is backed into a loading bay in this area, and the opened rear is brought into close proximity with the portal and cargo doors of the facility. Manual and automated techniques are then employed to offload the cargo from the trailer for placement within the facility 124. During unloading, the AV yard truck can remain hitched to the trailer or can be unhitched so the yard truck is available to perform other tasks. After unloading, the AV yard truck eventually removes the trailer from the unloading area 140 and either returns it to the staging area 130 or delivers it to a loading area 150 in the facility 124. The trailer, with rear swing (or other type of door(s)) open, is backed into a loading bay and loaded with goods from the facility 124 using manual and/or automated techniques. The AV yard truck can again hitch to, and haul, the loaded trailer back to the staging area 130 from the loading area 150 for eventual pickup by an OTR truck. Appropriate data tracking and management is undertaken at each step in the process using sensors on the AV yard truck and/or other manual or automated data collection devices—for example, terrestrial and/or aerial camera drones.

Having described a generalized technique for handling trailers within a facility reference is now made to FIGS. 2-4, which show exemplary yard trucks 200 and 300 for use with the various embodiments described hereinbelow. The yard truck 200 (FIG. 2) is powered by diesel or another internal combustion fuel, and the yard truck 300 (FIGS. 3 and 4) electricity, using appropriate rechargeable battery assembly that can operate in a manner known to those of skill. For the purposes of this description, the AV yard truck is powered by rechargeable batteries, but it is contemplated that any other motive power source (or a combination thereof) can be used to provide mobility to the unit. Notably, the yard truck 200, 300 of each example respectively includes at least a driver's cab section 210, 310 (which can be omitted in a fully autonomous version) and steering wheel (along with other manual controls) 212, 412 and a chassis 220, 320, 420 containing front steerable wheels 222, 322, and at least one pair of rear, driven wheels 224, 324 (shown herein as a double-wheel arrangement for greater load-bearing capacity). The respective chassis 220, 320 also includes a so-called fifth (5th) wheel 240, 340, that (with particular reference to the truck 300 in FIGS. 3 and 4) is arranged as a horseshoe-shaped pad 342, 442 with a rear-facing slot 344 (FIG. 3), which is sized and arranged to receive the kingpin hitch (shown and described further below) located at the bottom of a standard trailer (not shown). The fifth wheel 240, 340, 440 is shown tilted downwardly in a rearward direction so as to facilitate a ramping action when the truck is backed onto the trailer in FIG. 2. In FIG. 4, the fifth wheel 440 is shown raised by a lever arm assembly 446, which, as described below, allows the landing gear of the trailer (when attached) to clear the ground during hauling by the truck 400. The lever assembly 446 or other fifth wheel-lifting mechanisms can employ appropriate hydraulic lifting actuators/mechanisms known to those of skill so that the hitched trailer is raised at its front end. In this raised orientation, the hitch between the truck and trailer is secured.

The AV yard truck can include a variety of sensors as described generally above, that allow it to navigate through the yard and hitch-to/unhitch-from a trailer in an autonomous manner that is substantially or completely free of human intervention. Such lack of human intervention can be with the exception, possibly, of issuing an order to retrieve or unload a trailer—although such can also be provided by the YMS via the server 120 using a wireless data transmission 160 (FIG. 1) to and from the truck (which also includes an appropriate wireless network transceiver—e.g. WiFi-based, etc.).

Figure 2:
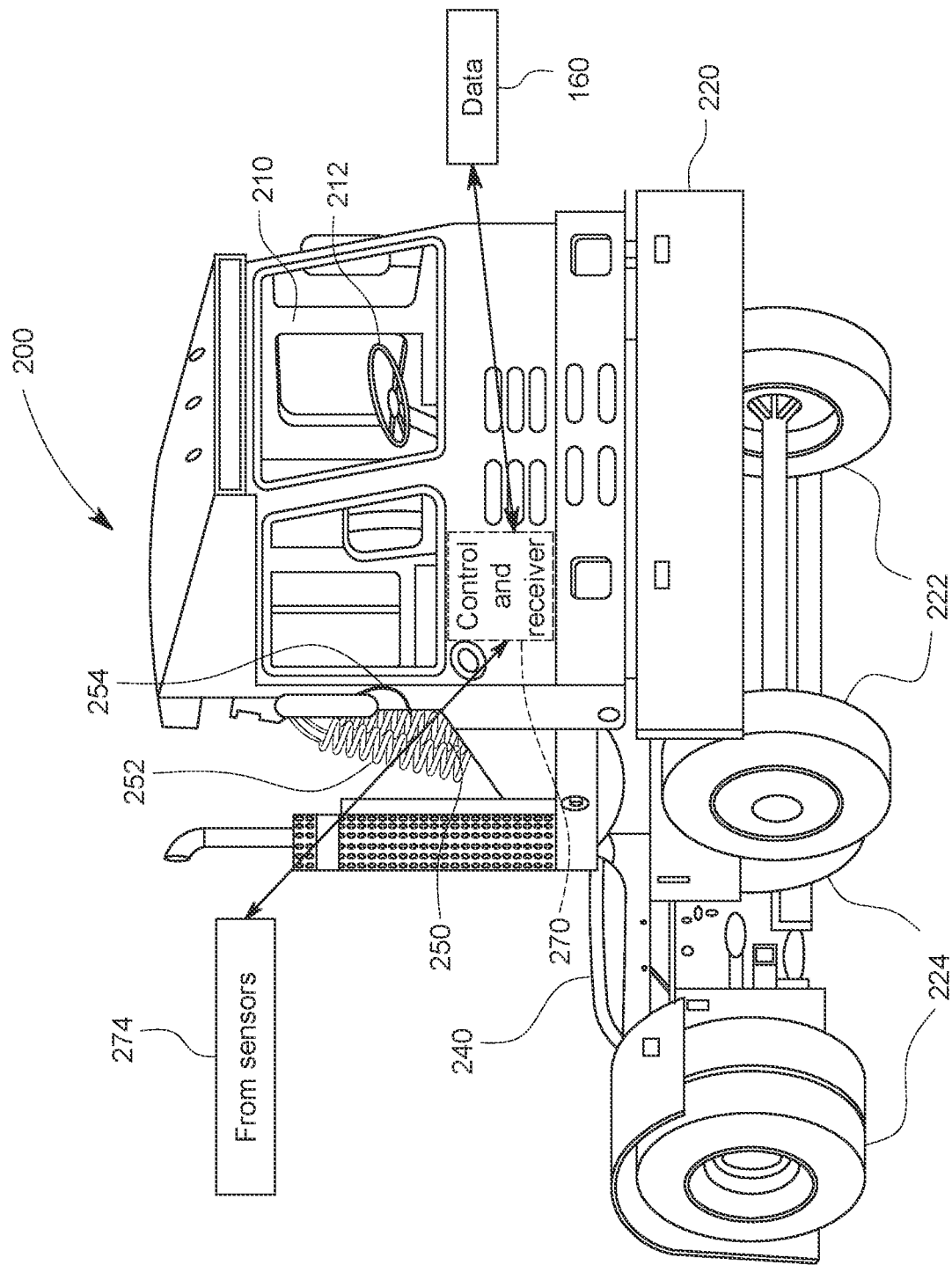
FIG. 2 is a perspective view of a fuel-powered AV yard truck for use in association with the system and method herein.
Figure 3:
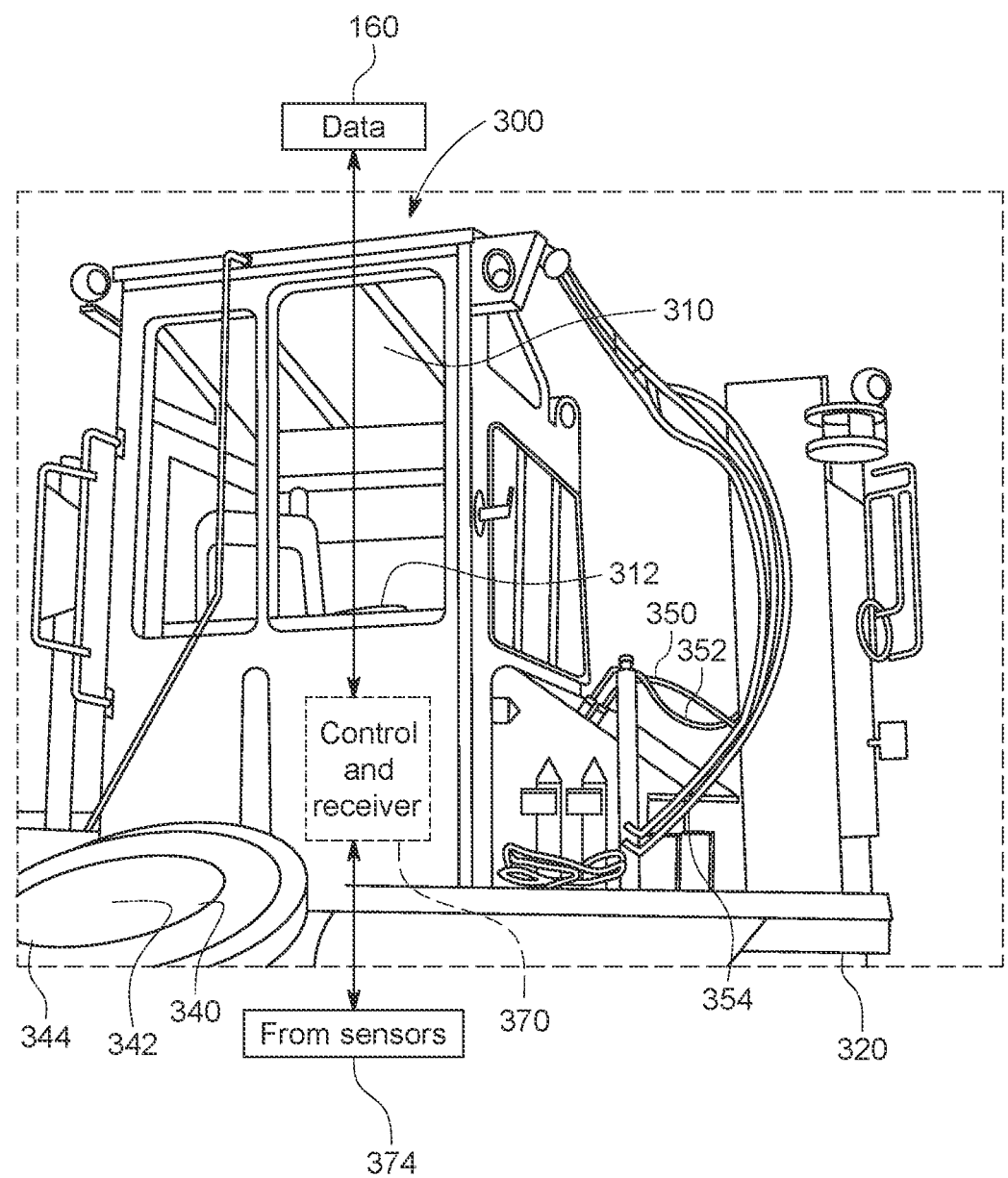
FIG. 3 is a rear-oriented perspective view of an electrically powered AV yard truck for use in association with the system and method herein, showing service connections (e.g. pneumatic braking and electrical) thereof.
Figure 4:
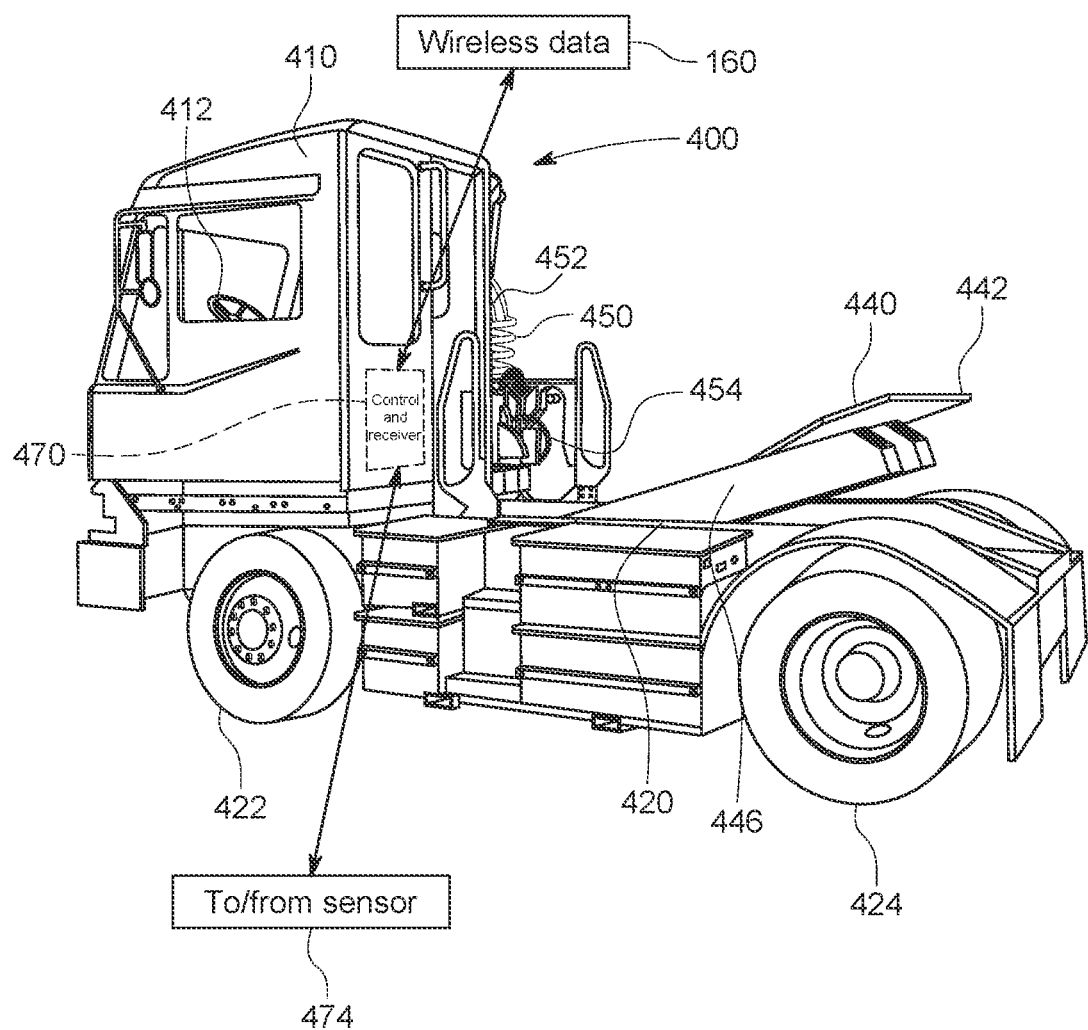
FIG. 4 is a rear-oriented perspective view of another electrically powered AV yard truck, showing a truck chassis raised fifth wheel thereof.

Notably, the AV yard truck 200, 300 and 400 of FIGS. 2, 3 and 4, respectively, includes an emergency brake pneumatic hose 250, 350, 450 (typically red), service brake pneumatic hose 252, 352, 452 (typically blue) and an electrical line 254, 354, 454 (often black), that extend from the rear of the cab 210, 310, 410 and in this example, are suspended front the side thereof in a conventional (manually connected) arrangement. This allows for access by yard personnel when connecting and disconnecting the hoses/lines from a trailer during the maneuvers described above. The AV yard truck 200, 300, 400 includes a controller assembly 270, 370 and 470, respectively, shown as a dashed box. The controller 270, 370, 470 can reside at any acceptable location on the truck, or a variety of locations. The controller 270, 370, 470 interconnects with one or more sensors 274, 374, 474, respectively, that sense and measure the operating environment in the yard, and provides data 160 to and from the facility (e.g. the YMS, server 120 etc.) via a transceiver. Control of the truck 200, 300, 400 can be implemented in a self-contained manner, entirely within the controller 270, 370, 470 whereby the controller receives mission plans and decides on appropriate maneuvers (e.g. start, stop, turn accelerate, brake, move forward, reverse, etc.). Alternatively, control decisions/functions can be distributed between the controller and a remote-control computer—e.g. server 120, that computes control operations for the truck and transmits them back as data to be operated upon by the truck's local control system. In general, control of the truck's operation, based on a desired outcome, can be distributed appropriately between the local controller 270, 370, 470 and the facility system server 120.

Figure 5:
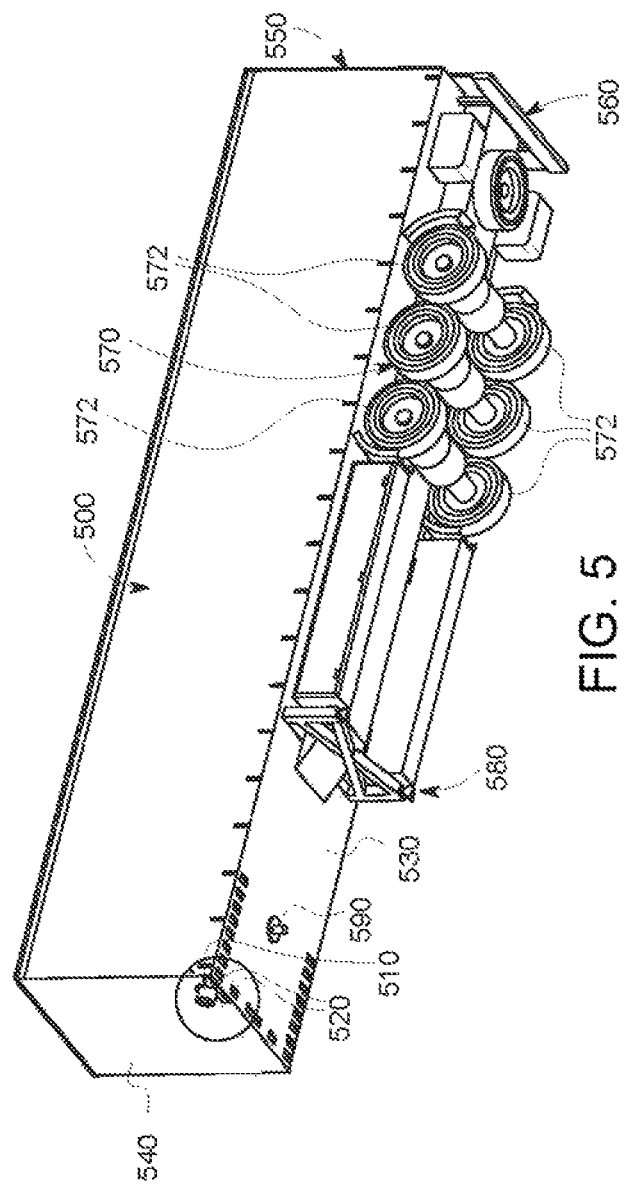
FIG. 5 is a bottom-oriented perspective view of a trailer showing various operational components thereof.

FIG. 5 is a bottom-oriented perspective view of a trailer 500 showing various operational components thereof. The trailer rear 550 can include swinging or rolling doors-among other types (not shown). An underride protection structure 560 is provided beneath the rear of the body. A set of wheels 572—in the form of a bogey arrangement 570 is shown adjacent to the rear 550. A movable landing gear assembly 580 is provided further forward on the trailer bottom 530. The kingpin 590 is also depicted near the front face 540 along the bottom 530.

II. Door Opening

If the trailer is either equipped with a rolling door, or swing doors have already been secured in the open position by OTR driver (see above), or other representative, then the load can be directed to a pre-designated (un) loading dock. However, if the trailer is equipped with secured swing doors, in the closed position, then it is desirable to provide an automated mechanism to allow for the doors to be opened in an automated manner. In an embodiment, as shown generally in FIG. 6, the hitched-together truck and trailer 610 can be backed down to either a redesignated empty loading bay, or a stand-alone station (e.g. a wall) 600, that has been modified to include network connected camera(s) 620 and a set of articulating arms 632 that are part of a robotic assembly 630. Through the use of the camera(s) 620, a remote operator and/or processor 640 (that can include vision system and robot-servoing modules) operates the arms 632, and be capable of grasping door latches 652 (shown in phantom), unlocking the doors 650, swinging them approximately 270 degrees, and securing them to the sides 654 of the trailer. Each arm 632 can include an articulated end effector 634 that acts as a grasping device. Illustratively, instead of securing the conventional hooks and eyebolts found on most trailer door arrangements, securing doors 650 to the side 654 of the trailer 610 can be accomplished by the robotic arm delivering a stand-alone clamping mechanism 660 (FIG. 6A), which can be deployed to temporarily secure the door to the bottom of the trailer body as shown. The clamps can be constructed from a flexible polymer and/or a metal having discrete or integral spring members that allow for a removable pinch action. As such, the clamps can frictionally bias the lower edges of the doors against each side, free of slippage, but such friction can be overcome by grasping and removing the clamp. In general the robot and arms should allow clearance for the doors between an opened and closed condition (e.g. approximately 3-6 feet).

Figure 7:
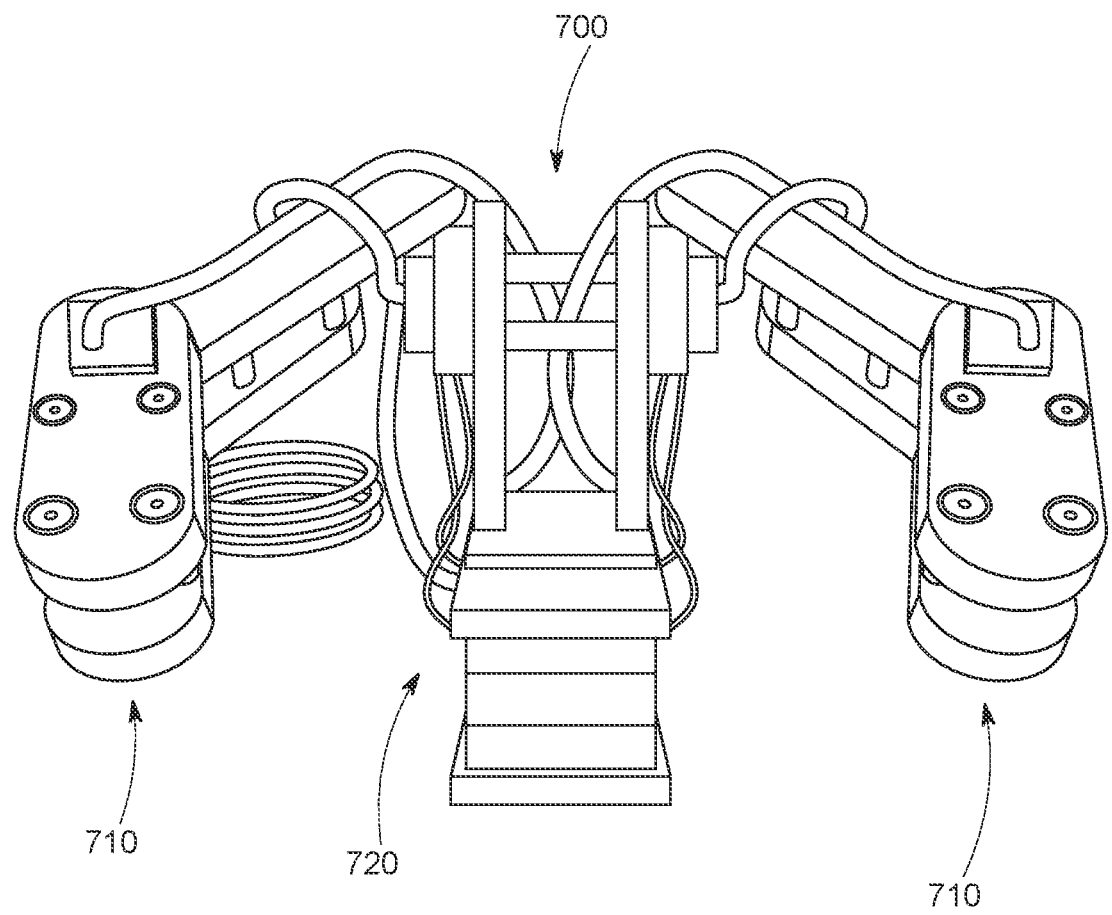
FIG. 7 is a perspective view of an exemplary, multi-arm robot for use in the door station of FIG. 6.

By way of non-limiting example a multi-arm robot assembly, which can be commercially available, can provide the basis for a manipulator used in handling doors. Such a commercially available robot 700 is shown by non-limiting example in FIG. 7. It consists of two independently moving arm assemblies 710 attached to a central base 720. A variety of alternate arrangements are contemplated, and such arrangements can facilitate motion is various degrees of freedom, as required to carry out latch-unlocking, swinging and securing functions as desired.

In operation, after the doors are swung open at the door station, the open-doored trailer can then be backed by the AV yard truck into an active unloading bay. Likewise, the process can be reversed once the trailer has been reloaded and is ready to depart the yard. That is, the yard truck hitches and/or hauls it away from the loading dock and backs it into the door station. The robot arrangement (630) is used to unclamp the doors, swing them closed and secure the latches.

Figure 8:
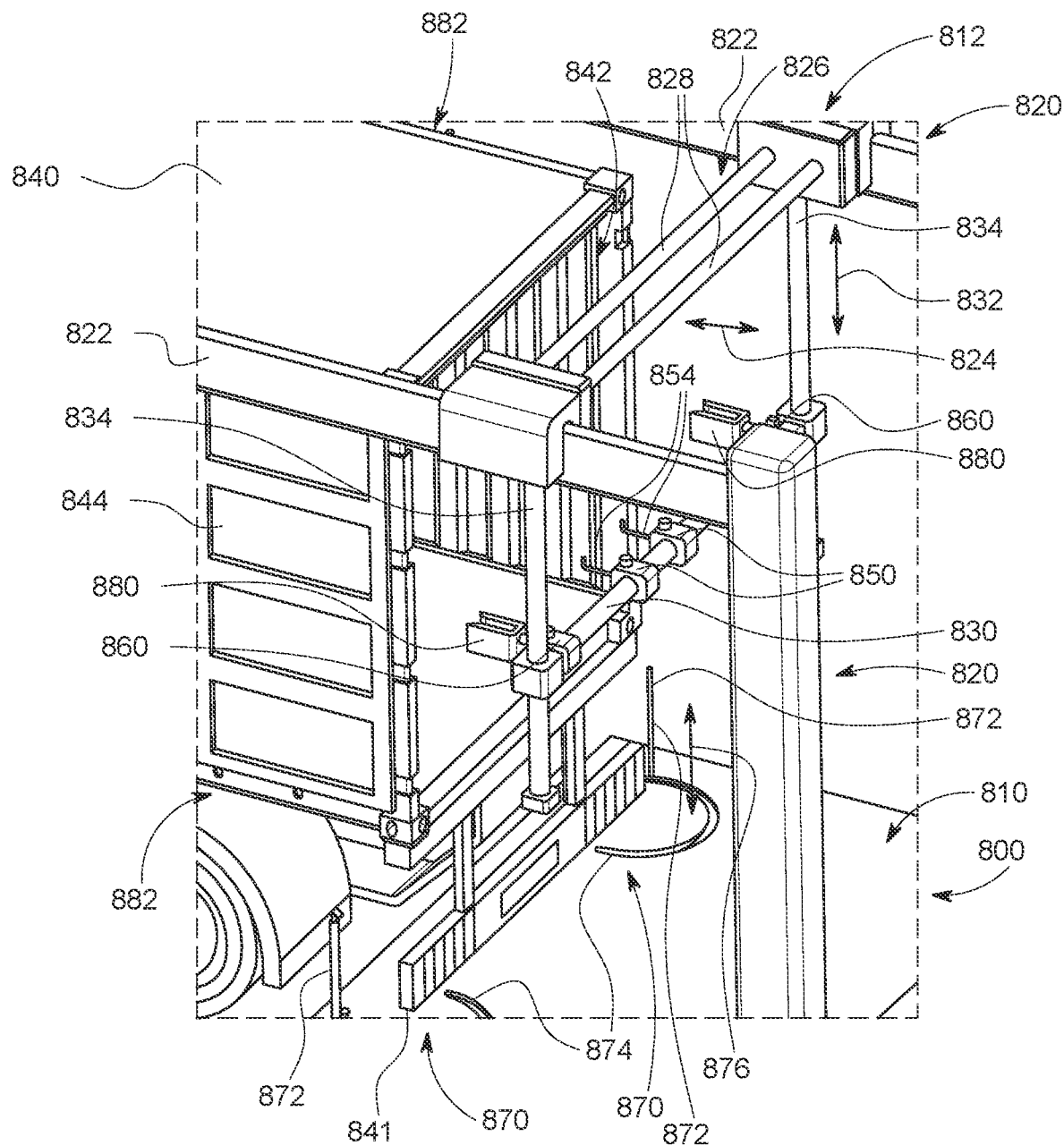
FIG. 8 is fragmentary perspective view of an exemplary trailer rear located adjacent to a door station consisting of floor base having retractable door-opening posts and a framework into which the trailer backs, having door unlocking and open-door-fixing mechanisms that selectively engage the trailer swinging rear doors.
Figure 8A:
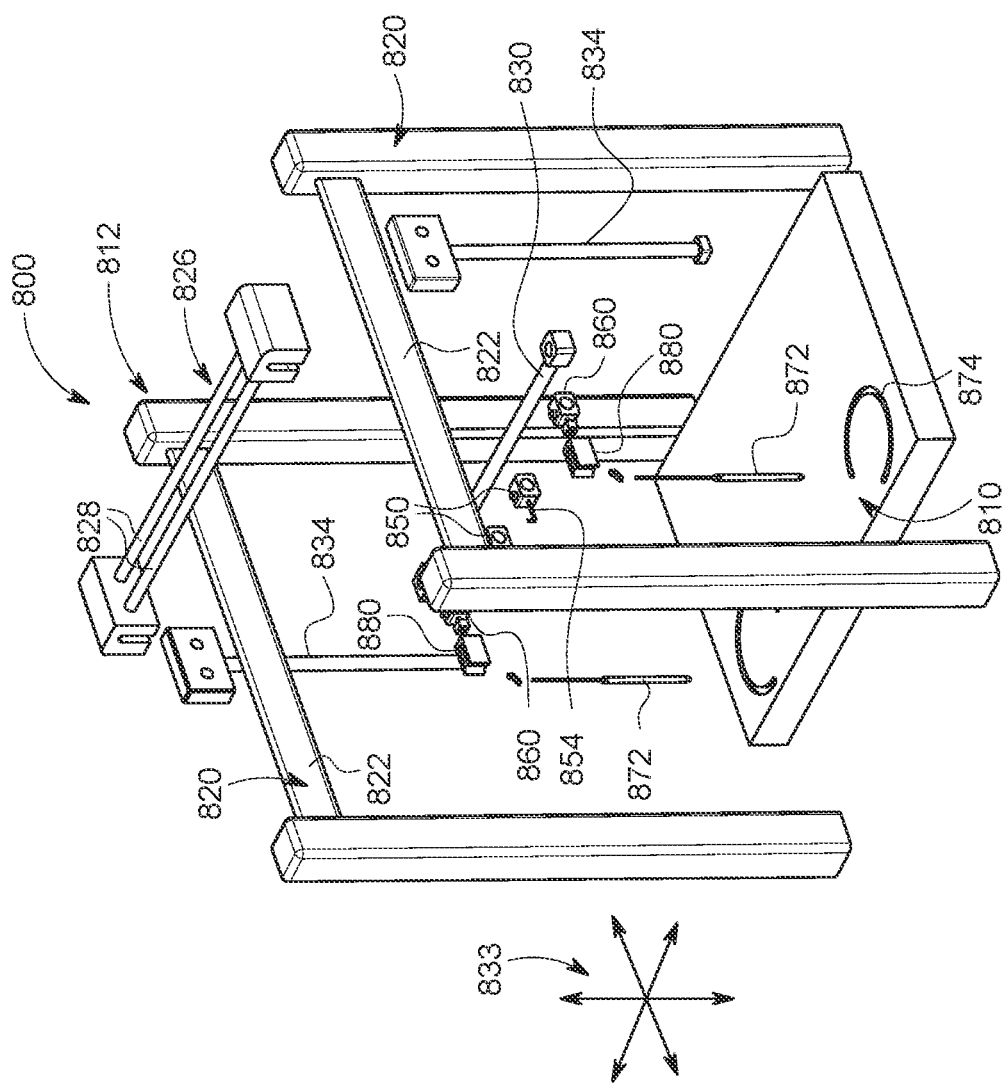
FIG. 8A is an exploded perspective view of the door station of FIG. 8.

In another embodiment, shown in FIG. 8, the door station 800 employs unique mechanisms for each discrete task. Each mechanism (a basic rod, set of rods, or rod(s) with end effectors) is responsible for performing a particular task. The station 3200 consists of a floor base 810 and an upright, framework 812 composed of a pair of spaced-apart (U-shaped) gantry frame members 820 (e.g. approximately 8-14 feet apart, 8-14 feet long, 6-14 feet tall). With further reference to FIG. 8A, the structure of the framework 812, and overall door station, is also shown in exploded view. The framework 812 supports a vertically moving (double-arrow 832) cross beam or slide 830. The top beam 822 on each frame member 820 defines a slide, upon which moves (in a forward/rearward direction-double-arrow 824) a linear slide. The linear slide 826 include (e.g.) lateral bars 828, which carry spaced-apart, vertical posts 834. These posts 834 are spaced apart at least the width of the trailer 840. The posts carry, and allow vertical movement (double arrow 832) of a lateral cross beam or slide 830. Note that linear motion (vertically and horizontally, and up/down, front/rear, left/right—see axis 833) of the various sliding components herein can be effectuated by a variety of mechanism, which should be clear to those of skill, including rack and pinion systems, driven lead screws, linear motors, pneumatic/hydraulic (fluid) pistons.

The cross beam/slide 830 includes a several mechanisms that can (optionally) move horizontally along the cross beam 830 and extend as needed (under front/rear motion of the linear slide 826) to engage the rear 842 of the trailer 840. Note, briefly, the presence of an underride bar 841, which can be clamped by a dock-lock or other safety mechanism as described further below. These cross-beam-mounted mechanisms include a door unlatching mechanism 850 and an open door locking/fixing mechanism 860 (on each of opposing sides of the cross beam 830). The door unlatching mechanism 850 employs a pair of forwardly extended, upturned hooks, or other suitable end-effector (e.g. a gripper jaw, electromagnet, etc.), 854 that enter below each latch by coordinated motion of the forward/rearward-moving linear slide 826 and the upward/downward movement of the cross beam 830. Once hooked, each latch is lifted and the hooks 854 are moved rearwardly to rotate the lifted latches and thereby rotate and unlock the (typically conventional trailer door rods).

Once unlatched, the doors are swung open using the opening mechanism 870 residing in the floor base 810. Notably, the door opening mechanism 870 of this embodiment, defines a pair of posts or rods 872 that each uniquely rise (double-arrows 876) out of each of two (left and right) lunate curved slots 874 on the floor base 810, and, once engaged with the interior of each respective (now-unlatched) swing door 844, execute motion in an arc along its path to position each door flush, or close to flush, along the side 882 of the trailer 840. Note that the posts 872, while tracing a semicircular path (defined by slots 874) to swing open the doors can follow a partial-polygonal, elliptical, irregularly curved and/or straight line path to move the doors to the sides of the trailer. Moreover, while extending/retracting posts are shown, another structure, such as a cam wheel with a rising post, or similar arrangement can be used in alternate embodiments. Also, while not shown, the posts 872 can be driven beneath the floor by a rotating drive plate, swinging arm, curved rack and pinion, or a variety of other mechanical systems that should be clear to those of skill.

Once the posts 872 have moved the doors to a swung-open position, along the sides of the trailer as shown in FIG. 8, a separate device 860 mounted on the cross beam 830 at opposing sides thereof, delivers a flexible, rubberized (or the like) horseshoe or clip-shaped clamp 880 over the now-sandwiched door 844 and trailer side 880 to prevent it from swinging closed, and maintain it engaged against the side 882 of the trailer.

Figure 8B:
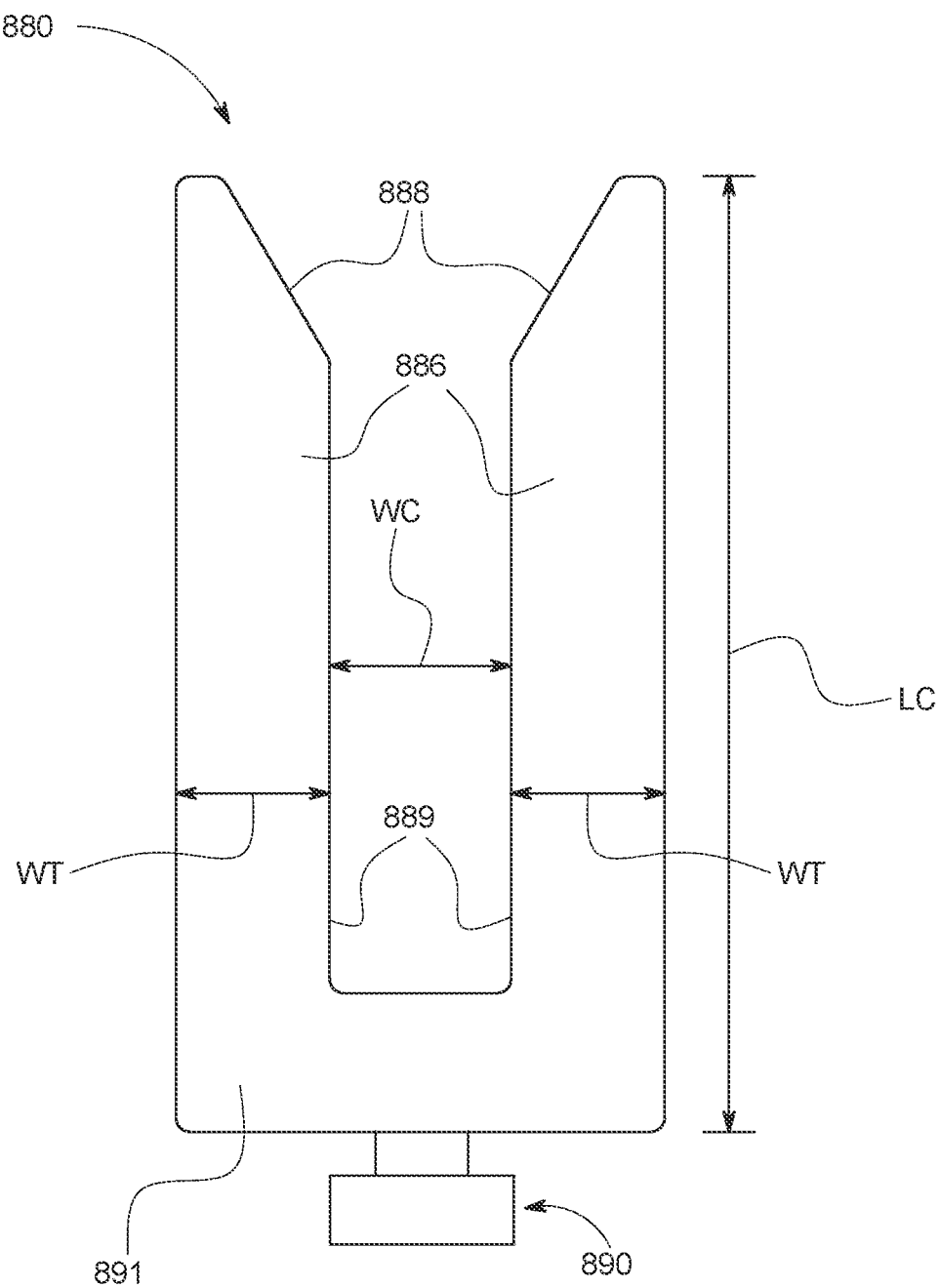
FIG. 8B is a plan view of an exemplary door-fixing clamp that can be applied to a swung-open trailer door to maintain it in such position during transit and unloading for use in the open-door-fixing mechanism of FIG. 8.
Figure 8C:
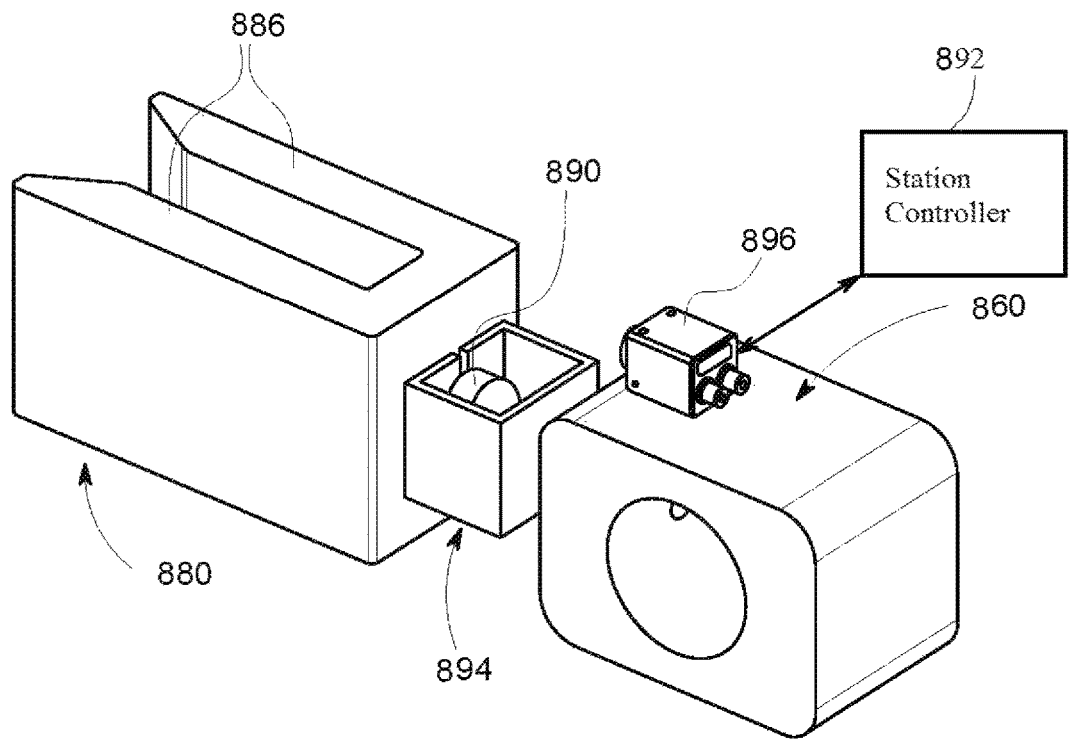
FIG. 8C is a perspective view of the door-fixing clamp and associated gripper mechanism of the open-door-fixing mechanism of FIG. 8, shown gripping the clamp.
Figure 8D:
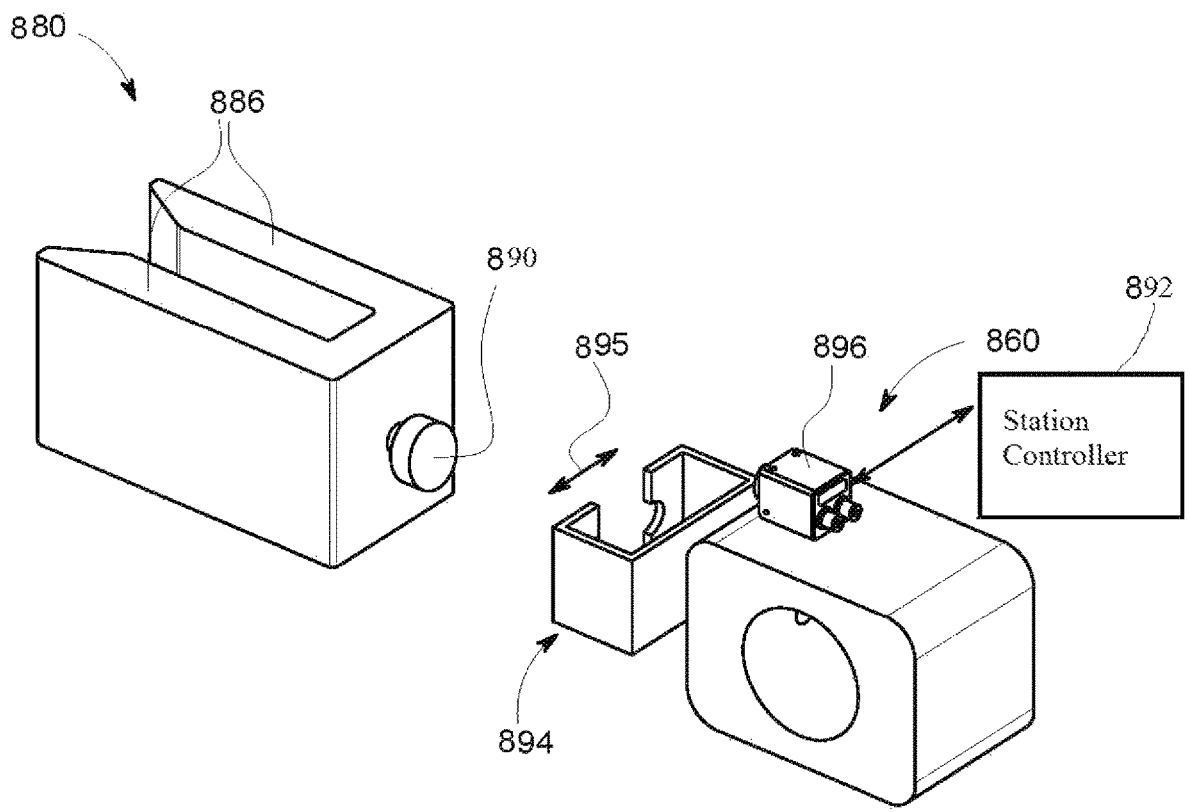
FIG. 8D is a perspective view of the door-fixing clamp and associated gripper mechanism of FIG. 8C, shown releasing the clamp.

With particular reference to FIGS. 8B-8G, the structure and operation of a trailer swing-door hold-open mechanism according to an embodiment is shown in greater detail. As shown in FIG. 8B, the clamp 880 is shown in plan view. The clamp 880 is constructed from a durable, flexible material—e.g. synthetic or natural rubber, nylon, ABS, or a composite (e.g. glass-filled nylon). Alternatively, the clamp can be constructed wholly or partially from metal—with sufficient spring constant or an integrated spring component. The clamp 880 has a length LC—which should be sufficient to allow it to firmly/frictionally engage the swung-back trailer door free of slippage—for example 4-15 inches. The clamp 880 is shaped similar to a clothespin, with a pair of opposing tines 886, with opposing, tapered free (distal) ends 888. The ends 888 assist in guiding the clamp onto the swung-open door. The width WC between the tines 886 should be chosen based upon the thickness TD (FIG. 8E) of the sandwiched door and side. For example, the width WC is approximately 2-5 inches. The inner surfaces 889 of the tines 886 define parallel planes as shown, but one or both can alternatively define a polygonal (non-planar) and/or curved inner surface to facilitate gripping and holding of the swung-back door against the trailer side. The thickness of the clamp (perpendicular to the page can vary (e.g. 1-3 inches), as can the width WT of each tine 886 (e.g. 1-3 inches). These parameters help to determine the durability and spring constant of the clamp. The proximal, connected end 891 of the clamp 880 includes a T-shaped stud 890, that is sized and arranged to be selectively gripped (FIG. 8C) and released by a horizontally moving (double-arrow 895 in FIG. 8D) gripper 894. An electrical connector 896 that powers an actuator (e.g. a solenoid) can be used to operate the gripper 894 between the gripped and released states. Appropriate springs and other mechanisms can also be employed on the gripper 894, in a manner clear to those of skill. The gripper 894, and other functional elements of the door station, can be interconnected with a local door station controller that is also linked to the overall autonomy system within the facility (e.g. the server 120).

It should be noted that the door station arrangement described herein effectively addresses the automation of the door-unlatching and opening task, but also more generally reduces or eliminates wasted time, fuel and safety hazards resulting from the need for a driver to exit the cab of his/her truck every time swing doors are to be opened. Hence, the applicability of the door station arrangement herein extends not only to automated yard operations, but also to conventional, manually attended yards where trailer swing doors require handling.

Illustratively, the door station arrangement can be positioned in one or more designated locations in a trailer yard (e.g. near the guard shack where trailers check in, or in a designated parking spot. The arrangement described above can, more generally, be part of an overhead gantry or a portable system.

A swing door opening system according to the door station arrangement can be operated by an operator onsite, or a remote operator responsible for operating multiple systems across wide-spread geographies. In a training procedure, a vision system associated therewith can use available (or custom) pattern recognition and robot servoing vision tools (using cameras, which can be stationary and/or located on the manipulator/cross beam of the arrangement) to understand how to open the swing door(s) of many configurations. Such doors can represent a wide range of commercially available configurations, including those with 2, 3 or 4 lock rods/latches, handles at different heights and with/without e.g. rear door aerodynamics, such as the well-known TrailerTail®, rear, folding aerodynamic structure, available from Stemco LP of Longview, TX. In an illustrative operating environment, a trained system can potentially employ multiple (e.g. tens, hundreds, thousands), of these door stations, operating automatically at yards across the world. Such systems can include a manual override capability in the event it is desirable or mandatory that a human operator (i.e. a teleoperator, sitting in a remote control location) take over and control the door station manipulators accordingly and/or to notify an onsite person at the specific yard in which the door station resides. It is contemplated that the door station, and any other automated system described herein, can include an emergency stop switch, or other manual control, which is readily accessible and stops operation in the event of an emergency. Additional safety measures, such as animal/human presence detectors-relying on shape, heat signature and/or other biometric data, can be employed to ensure that automated systems do not harm a living entity.

Figure 8E:
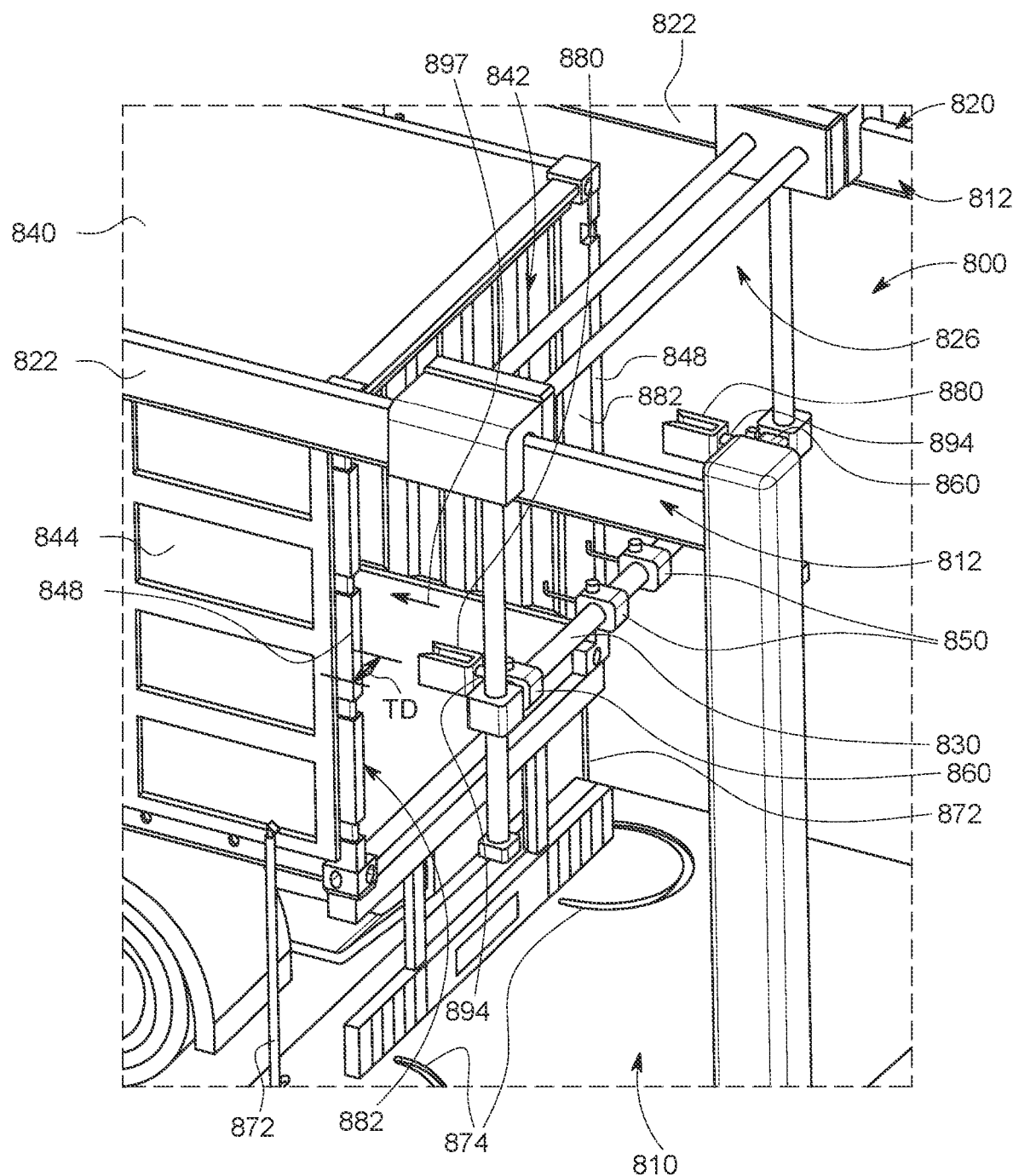
FIG. 8E is a fragmentary perspective view of the exemplary trailer rear and door station of FIG. 8 showing the open-door-fixing mechanism moving to apply clamps to the edges of the swung-open doors, as the door-opening posts are extended from the floor base to maintain the doors in swung-open positions.
Figure 8F:
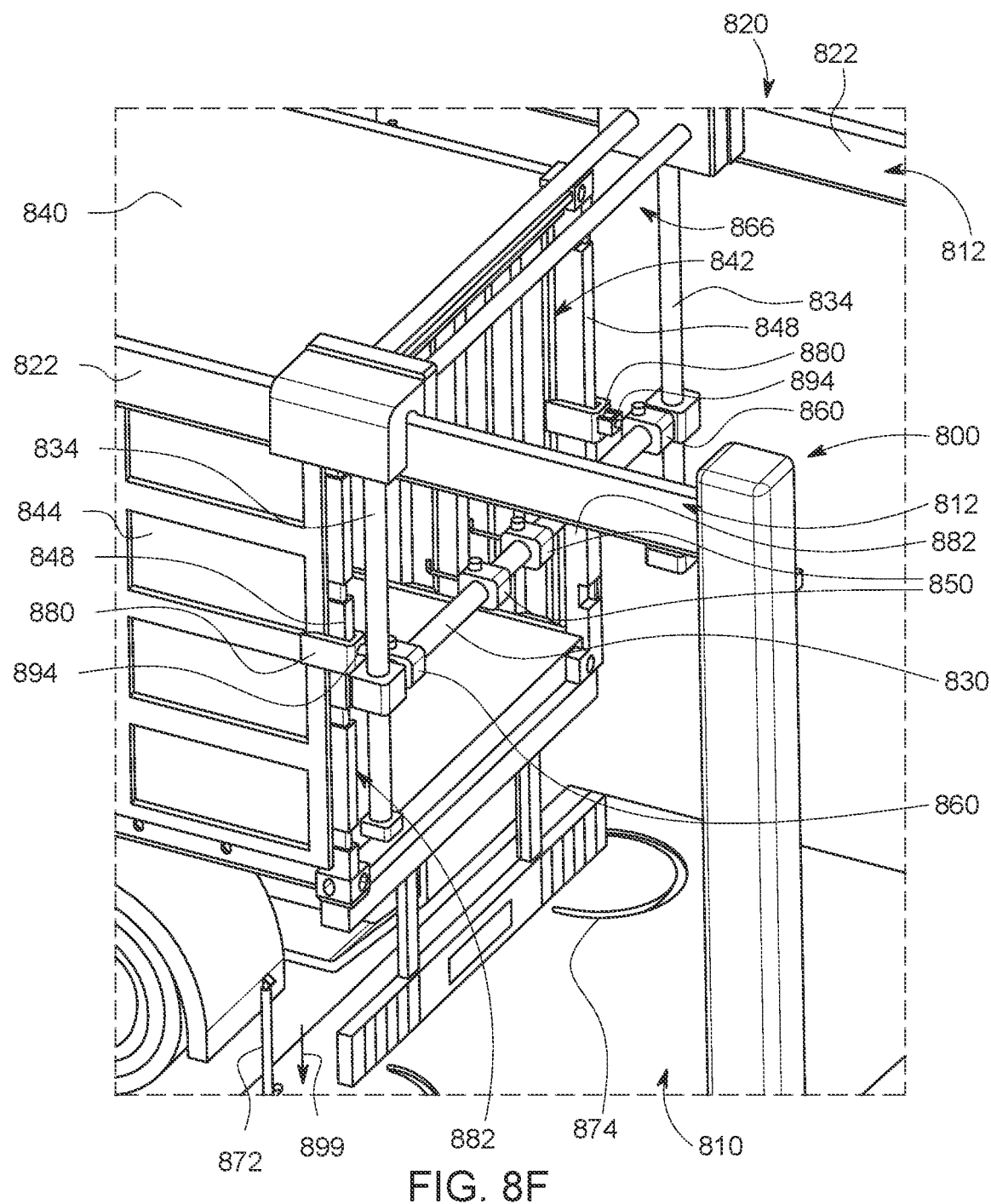
FIG. 8F is a fragmentary perspective view of the exemplary trailer rear and door station of FIG. 8 showing the open-door-fixing mechanism applying clamps to the edges of the swung-open door, as the door-opening posts retract into the floor base.
Figure 8G:
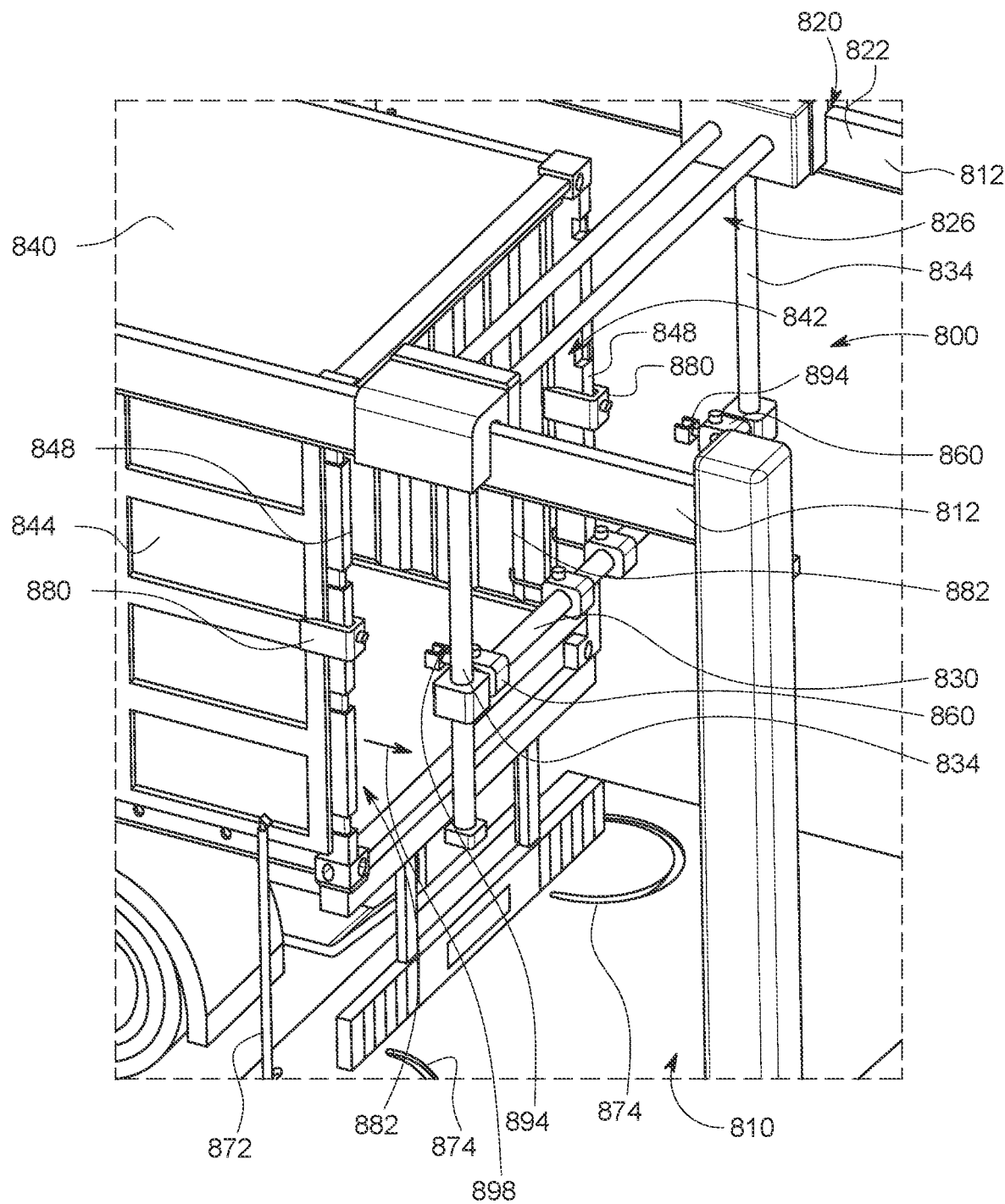
FIG. 8G is a fragmentary perspective view of the exemplary trailer rear and door station of FIG. 8 showing the open-door-fixing mechanism moving away from the edges of the swung-open doors, with the clamps released from the grippers and securing the doors in swung-open positions.

In operation, as shown in FIG. 8E, once the doors are swung open by the posts 872, the linear slide 876 moves forwardly (arrow 897) on the top beams 822 to move the clamps 880 (gripped by grippers 894 on the locking/fixing mechanism 860) toward the edges 848 of the swung-back doors 844. Then, in FIG. 8F, the forward motion of the linear slide 826 biases the clamps 880 over the edges 848, and into engagement with the swung back doors 848 and trailer sides 882. The gap of width WC between clamp times 886 (FIG. 8B) is smaller than at least a portion of the thickness TD of the stacked/sandwiched door and side so that the tines are flexed (elastically deformed) outwardly as the clamp 880 is driven over the edge 848. The clamp material and elastic deformation of the tines collectively generate a frictional holding force that maintains the door 844 against the side 882 in the swung-back orientation. The posts 872 can now be retracted (arrow 899) into the floor base 810 (sufficiently to allow clearance with respect to the doors and other trailer components), as the doors are now secured by the clamps 880. Thus, as shown in FIG. 8G, the linear slide 826 moves rearwardly (arrow 898) to provide clearance with respect to the trailer 840 and prepare for the next trailer to enter the station 800. At this time, the clamp grippers 894 are empty, and can be reloaded with new clamps (880) from a magazine or other source (not shown).

Note that the geometry and material of the depicted clamp 880 is highly variable in alternate embodiments—e.g. it can have a more C-clamp-like appearance with contact pads that are limited in surface area. It can also be constructed from two separate clamp members that are hingedly joined and include (e.g. a separate mechanical (e.g. wrapped) spring. Likewise, the gripper assembly can operate in a variety of ways and employ a variety of mechanical principles to deliver and releasably attach the clamp to the swung-back door. The system (using the depicted clamp 880 or another type of clamp) can include powered and/or non-powered release mechanisms—for example a mechanism that releases the clamp when the slide 826 is driven sufficiently onto the door edge 848. It is desirable generally that the station swing the doors back and then apply a holding device that can be later removed by a robot or manual operator when no longer desired—for example, after loading is completed.

In an alternate embodiment, the functions and/or operation of the door station can be implemented using a mobile door-opening mechanism. The mechanism can be mounted on the trailer at the (e.g.) guard shack or integrated into the trailer.

Another form of mechanism can be provided on a moving base (e.g. a commercially available or custom mobile robot) deployed to the trailer and perform the same functions as the station at (e.g.) the time of hitching or unhitching to and from the AV yard truck. The robot can be autonomous, using on-board sensors, and/or guided by an operator. Such robots are currently employed in military, law enforcement and other tasks in which remote manipulation is desired tasks and can be adapted to the present embodiment.

III. Locking Trailer to Dock

In operation, using sensors such as visual cameras, LiDAR, radar, and/or other on-board sensing devices, the AV yard truck reverses, and aligning the trailer with a pre-designated (un) loading dock. The sensors on the AV yard truck safely guide the truck and trailer down the loading bay ramp and securely place the trailer against the bay door. Once secured, if outfitted, a dock-lock can be activated at the loading dock, and loading/unloading can thereafter be initiated.

In various embodiments, a so-called dock-lock can be a commercially available system that is located beneath the loading dock surface and deploys clamps when the trailer is to be secured for loading/unloading. The system can be initiated automatically or by a loading dock operator. In general, the dock-lock clamps engage a suitably sturdy structure on the rear of the trailer—for example the under-ride-prevention frame/bar assembly (see structure 560 in FIG. 5). When deployed, certain commercially available systems operate a visible indicator light system. A green light is illuminated inside the loading area when locked and a red light is illuminated outside when locked. Conversely, when unlocked, a red light is provided inside and a green light is provided outside. The AV yard truck camera(s) and/or facility cameras that are integrated with the system server (120 in FIG. 1) can be adapted to identify the type and color of the light and use this to guide movements of the AV Yard truck—for example, it refrains from hauling the trailer until it reads an exterior green light. Alternatively, or additionally, sensors can be provided directly on or to the locking mechanism and provide status information directly to RF, or other types of, receivers, interconnected with the AV yard truck and/or facility server.

In general, once a trailer is docked and locked, depending upon the current demand for the services AV yard truck, it can be programmed to stay in position or to disconnect and perform its next task, returning later to reconnect. Also, when members of the (un) loading crew have completed the task, an individual of this crew can designate the trailer as ready to be moved. The AV yard truck sensors will read the signal of the dock-lock mechanism, for when it is safe to depart. Once away from the dock, if required, the trailer doors can then be shut by any of the previously described options. Depending upon yard protocols, the AV yard truck would then bring the trailer back to the staging area or to another pre-designated location, disconnect, whereupon another visual inspection could be performed, and updating of the YMS can be completed.

IV. Additional AV Yard Truck Devices and Operations

A. Loading Dock Communications

From a safety perspective, as with its human-driver counterpart, it is desirable to provide a coordinated handoff of approval between an AV yard truck system and associated loading dock personnel (herein defined to include controllers, robots and robotic systems-in an automated warehouse environment) in order to enable movement/hauling of a trailer. In an embodiment, a communications system coordinates a safe handoff between autonomous systems and dock personnel to ensure that an AV yard truck does not separate from the dock without (free of) explicit permission to do so by dock personnel. The system also interoperates with other systems (e.g. a dock-lock or an automated wheel chock system) to coordinate the physical securing of a trailer when initially parked at the dock, in order to prevent the inadvertent movement of a trailer during loading/unloading. In addition, the communications system also facilitates a notification to dock personnel of a trailer's arrival at the dock, thereby permitting an opportunity to gain efficiency in loading/unloading operations.

Manual loading dock operations according to a prior art implementation currently rely upon visual signals, which are transmitted to the yard truck operator. A diagrammatic representation of a basic implementation of such a signal system 900, and associated light unit 910, is shown below in FIG. 9. The exemplary signal unit 910 consists of a red light 920 and green light 930, and manual inputs of locking state, shown here as (e.g.) three-position toggle switch that includes the selection between (a) a chocked trailer (green at the dock), (b) an unchocked trailer (red at the dock), and (c) the dock closed (red at the dock, and optionally, outside the dock). If the trailer is not presently undergoing a loading process, and can safely be hauled away, then the green signal light 930 is illuminated. If the trailer is not being hauled away, then the red signal light 920 is illuminated. Note that the driver of the yard truck (in this non-automated example) can also provide input to the wheel chock state by moving the three-position toggle switch 940, thereby indicating that the trailer wheels are chocked, not chocked, or if the dock is not operational for maintenance. The signal unit 910 connects to the building/yard infrastructure 960 via a wiring harness or other power/data link 950, to interoperate with dock door position signals, and internal controls and status lights interior to the dock facility.

Figure 9:
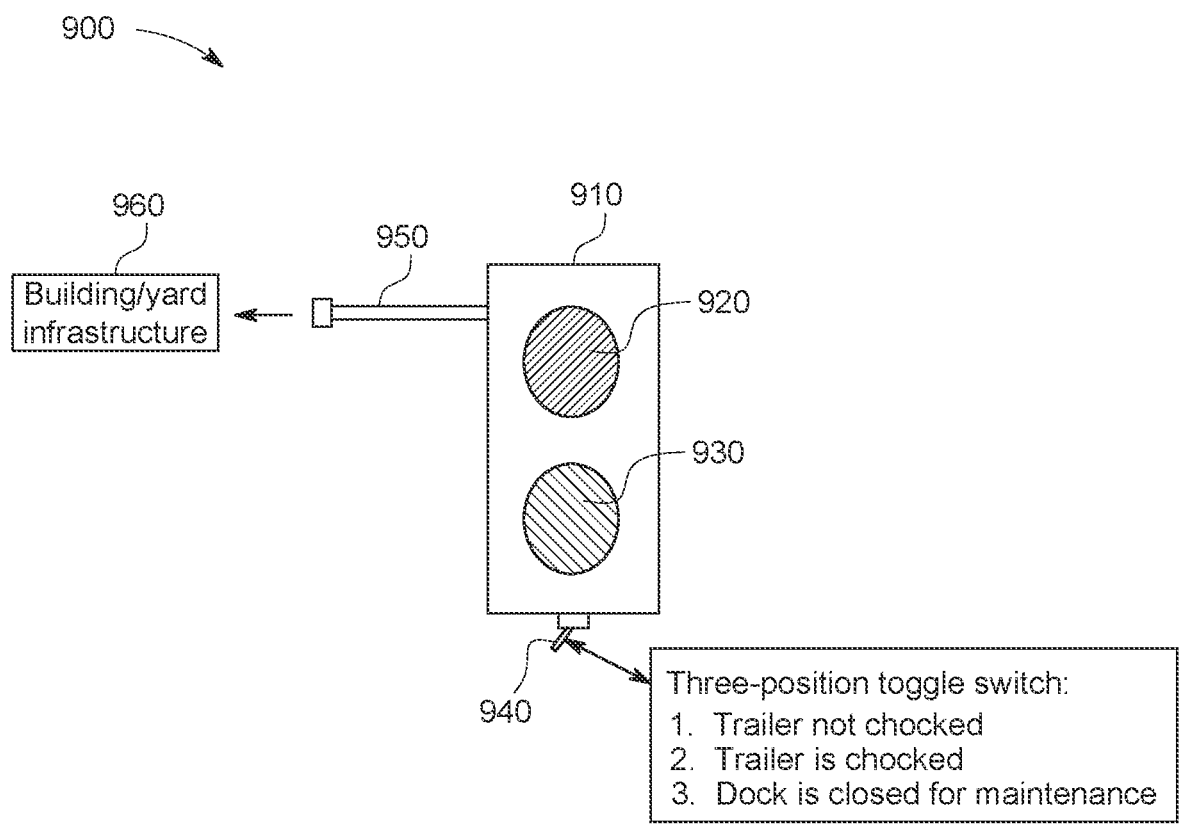
FIG. 9 is a schematic representation of a loading dock signal system and corresponding signal unit according to a prior art implementation, featuring a red light and a green light to indicate whether a trailer is safe to unload and/or haul away, or if the dock is open or closed.
Figure 10:
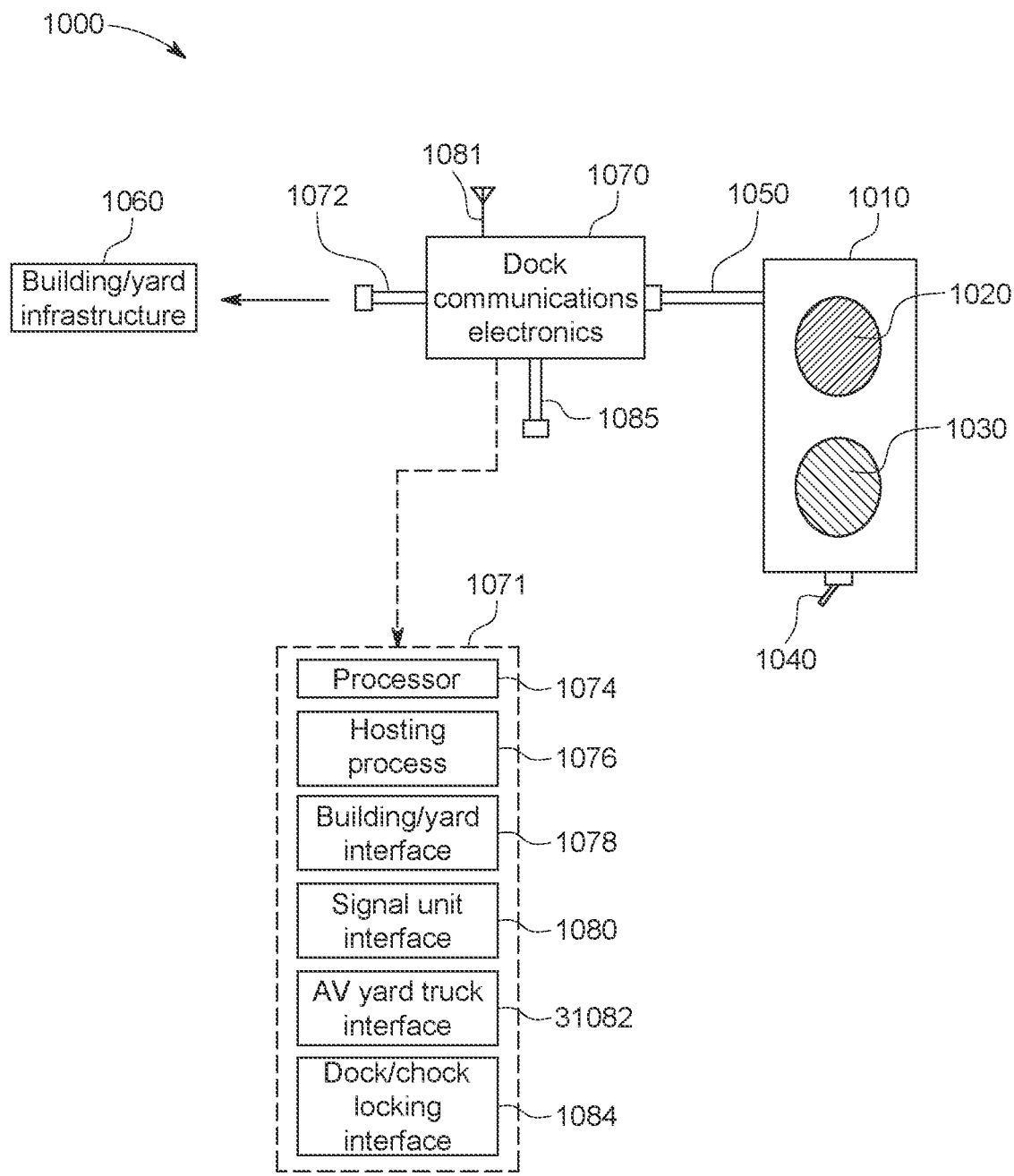
FIG. 10 is a schematic representation of a loading dock signal system with dock communications electronics added via wiring harnesses to allow for use in an autonomous truck environment, according to an embodiment.

In an embodiment, shown in FIG. 10, a signal arrangement 1000, similar to the manually operated arrangement 900 of FIG. 9 is shown. The signal unit 1010 can be constructed similarly or identically, and include a red light 1020, green light 1030, three-position switch 1040 and wiring harness/link 1050. Illustratively, an electronic communications device (interface) 1070 between the (e.g.) conventional signal unit 1010, which can be a pre-existing element in retrofit implementation, and the building/yard infrastructure (1060) connection via a wiring harness/link 1072. As shown further within the dashed box 1071, the communications device 1070 contains a processor 1060, a hosting process/software application 1076, interface(s) 1078 to the building/yard infrastructure 1078, interface(s) 1080 to the (e.g.) conventional signal unit 1010, interface(s) 1082 to the AV yard truck (described variously above) via a wireless data radio/link 1081, and optionally, interface(s) 1084 to any dock/chock locking system (as described above), if so equipped, via a wiring harness/link 1085. It should be clear that the use of a communication device/interface 1070 allows for the use of an existing (e.g. installed or off-the-shelf) signal unit. The dock communications electronics is responsible for providing readout of safe movement signals from the building/yard and providing those via a software interface to the autonomous system over the wireless data link. Additionally, with feedback from the autonomous system (e.g. on the Server), and optional dock/chock locking system, the dock communications electronics can provide status of locked chocked or not locked chocked to the building/yard infrastructure. However, this arrangement (1000) cannot generally change a physical switch state on the existing signal unit. This embodiment provides for electronic readout of safe state and provides this readout to the autonomous system without the need for measuring light state via a sensor, such as an external camera that senses the current light color or the location in the imaged unit of the illuminated signal (i.e. top for red, bottom for green, etc.).

Figure 11:
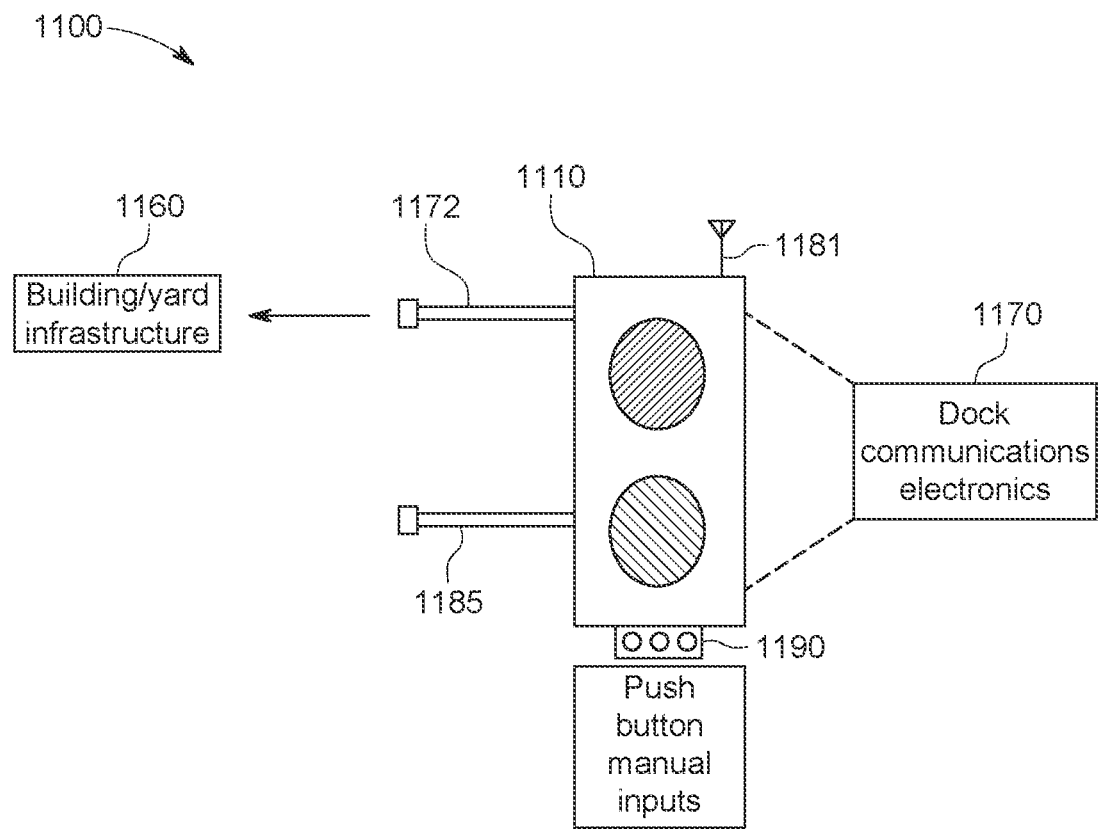
FIG. 11 is a schematic representation of a dock signal system with a custom/purpose-built dock signal units having additional capabilities to interoperate with autonomy systems of an autonomous truck environment, according to an embodiment.

FIG. 11 depicts another arrangement 1100 in which the signal unit 1110 is purpose-built (custom-built) with integrated interface components as described herein, or is retrofit with such integrated components, using a conventional signal unit as a basis for the retrofit. In this embodiment, shown in FIG. 11, the signal unit 1110 includes the dock communications electronics 1170 internal to (integrated with) the signal unit 1110. Similar or identical in function to the components of block 1071 (FIG. 10), the integrated electronics 1170 can include a processor, hosting process, interface to building/yard infrastructure 1160 (with associated wiring harness/link 1172), signal unit circuit (internal) interface, AV yard truck interface, with wireless radio link 1181 built onto the housing of the signal unit 1110, and optional dock/chock locking interface (with associated wiring harness/link 1185). As shown, the overall arrangement of wiring harnesses is simplified/reduced, and there is (typically) one physical unit to integrate at the dock (i.e. the integrated signal unit 1110). User inputs with respect to locked chocked or not locked chocked are integrated into the unit 1110 via pushbuttons 1190, so that manual inputs versus autonomous inputs of states (e.g. (a) a chocked trailer (green at the dock), (b) an unchocked trailer (red at the dock), and (c) the dock closed (red at the dock, and optionally, outside the dock) are consistent.

Figure 12:
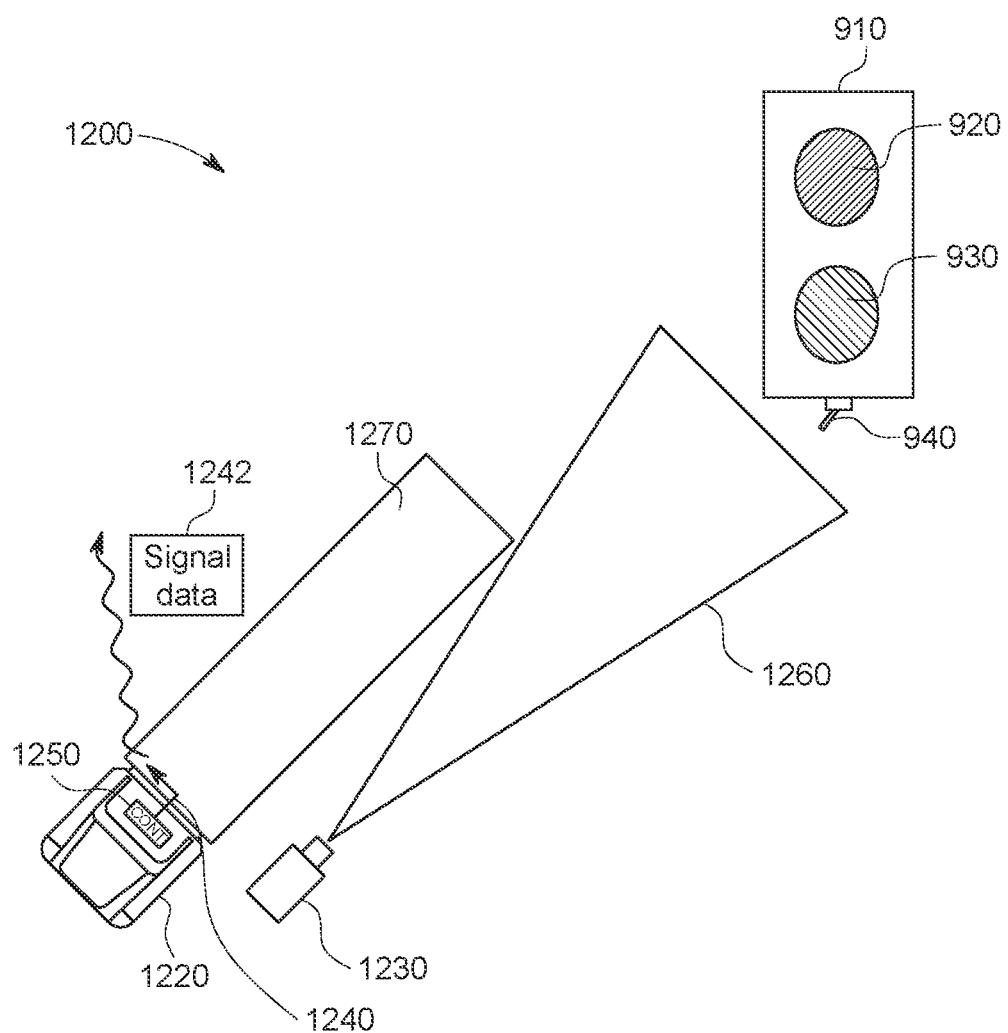
FIG. 12 is a diagram showing a system and method using an AV yard-truck-mounted camera or equivalent sensor to detect and report the status of a signal unit as described in (e.g.) FIG. 9, according to an embodiment.

FIG. 12 shows another illustrative arrangement 1200 for utilizing a conventional-style signal unit (e.g. the above-described signal unit 910 in FIG. 9). In this embodiment, the system observes the state of illumination (red 920 or green 930) of this conventional signal using one or more sensors 1230 mounted onboard (or associated with) the AV yard truck 1220 according to an embodiment herein. An example of one type of sensor is a color or grayscale electro-optical camera of appropriate design. However, other types of sensor/sensors are contemplated for use with this arrangement, such as a photodetector with a filter that only allows one form of light (red or green to pass). Data 1242 from the sensor(s) 1230 is analyzed and interpreted by a process (or) and/or software application within the AV yard truck controller 1250 or remote processor (e.g. the server), via the truck's wireless data link 1240, to determine if the red and/or green signal lights are illuminated—in much the same manner as a human operator of the yard truck would determine the system state. The results of this analysis and interpretation is provided to the AV yard truck system. It is contemplated that the sensor (camera 1230) is mounted so that the signal light(s) 920, 930 reside within its working range and field of sensing/view 1260 when the truck is located at an appropriate position in which receipt of such information is timely and convenient—for example when the truck is aligned with the dock for hauling, hitching and/or unhitching of the trailer 1270.

A generalization of the dock signal system is conceived, in which the actions of a robotic system operating in a yard or shuttle drive can be inhibited until proper authorization is provided. These generalized authorization concepts permit greater integration into yard and shuttle operations and provide for flexibility with respect to the robot operating in coordination with people, vehicles, and other material handling equipment.

Actions which may be inhibited may be thought of broadly and include both physical movements and virtual interactions with other components, vehicles, workers, robots, equipment, infrastructure components, dispatch (command and control), and so forth. These actions include all physical or virtual interactions a robotic system operating in a yard and shuttle run environments may make. Examples include, but are not limited to, a) Authority to enter and move through an intersection, b) Authority to enter and move through a pedestrian crosswalk, c) Authority to move around or under a crane, side loader, or other material handling equipment, d) Authority to enter or exit specific regions (e.g. charging stations, maintenance bays, etc.), e) Authority to maneuver around areas where maintenance, construction, or repairs work is taking place, f) Authority to approach or move away from swing door opening/closing stations, g) Authority to approach or move away from other robotic systems, such as automated swing door opening/closing stations, h) Authority to connect to site infrastructure data networks.

Several mechanisms are conceived to provide authorization, including physical, virtual, and sensed. Physical mechanisms are inputs that a person engages with in order to provide or remove authorization. These mechanisms include, but are not limited to, switches such as momentary or toggle switches. The state of these inputs is read electronically and are provided to the robot via wireless data communication. Virtual mechanisms are inputs that are engaged with via software interfaces, both to the robot and via software user interface applications. Sensed mechanisms refer to means by which the robot may obtain authorization (or not) via its onboard sensor suite, instead of being provided state data over wireless data transmitted to the robot. Various mechanisms are possible including sensor measurement of the state of signal lights, sensing and recognition of gestures made by personnel, and so forth.

Input to authorization mechanisms may be provided by people directly, or via other equipment (robotic or not) in the yard and shuttle environments. People include both other workers in the operational environment, as well as safety operators or observers, which may be stationed onboard the robot, in a chase vehicle, or a dismount location on the ground.

Onboard the robot, state of authorization mechanisms is read or sensed, and then used by the robot to determine of certain actions can be initiated or inhibited. These behaviors may be intimately intertwined with the primary objectives the robot has been tasked to fulfill, or peripheral interactions and behaviors. Without authorization, the robot does not proceed with actions upon which authorization is required. Upon reception of authorization, the robot can proceed with actions upon which it has been authorized to perform.

B. Reverse Assist Systems and Methods for Autonomous Truck/Trailer Operation

One unique challenge that an AV yard truck faces, while connected to a trailer, is safety while reversing. This primarily is due to the blind spot that is created directly behind the trailer. Vision and sensor systems mounted on the tractor are rendered less effective as they can be occluded by the (often as tall or taller, and elongated trailer). It is often undesirable to refit a trailer fleet with individual sensor systems to assist in the reversing process, and a variety of fleets can be encountered in a yard making it impractical to retrofit all vehicles that may encounter the yard or its autonomous vehicles. In addition, fitting trailers with specialized sensors adds costs and such are prone to damage and breakage in over-the road operations. Some exemplary types of reversing sensors can include cameras, LIDAR, radar, and/or sonar.

Figure 13:
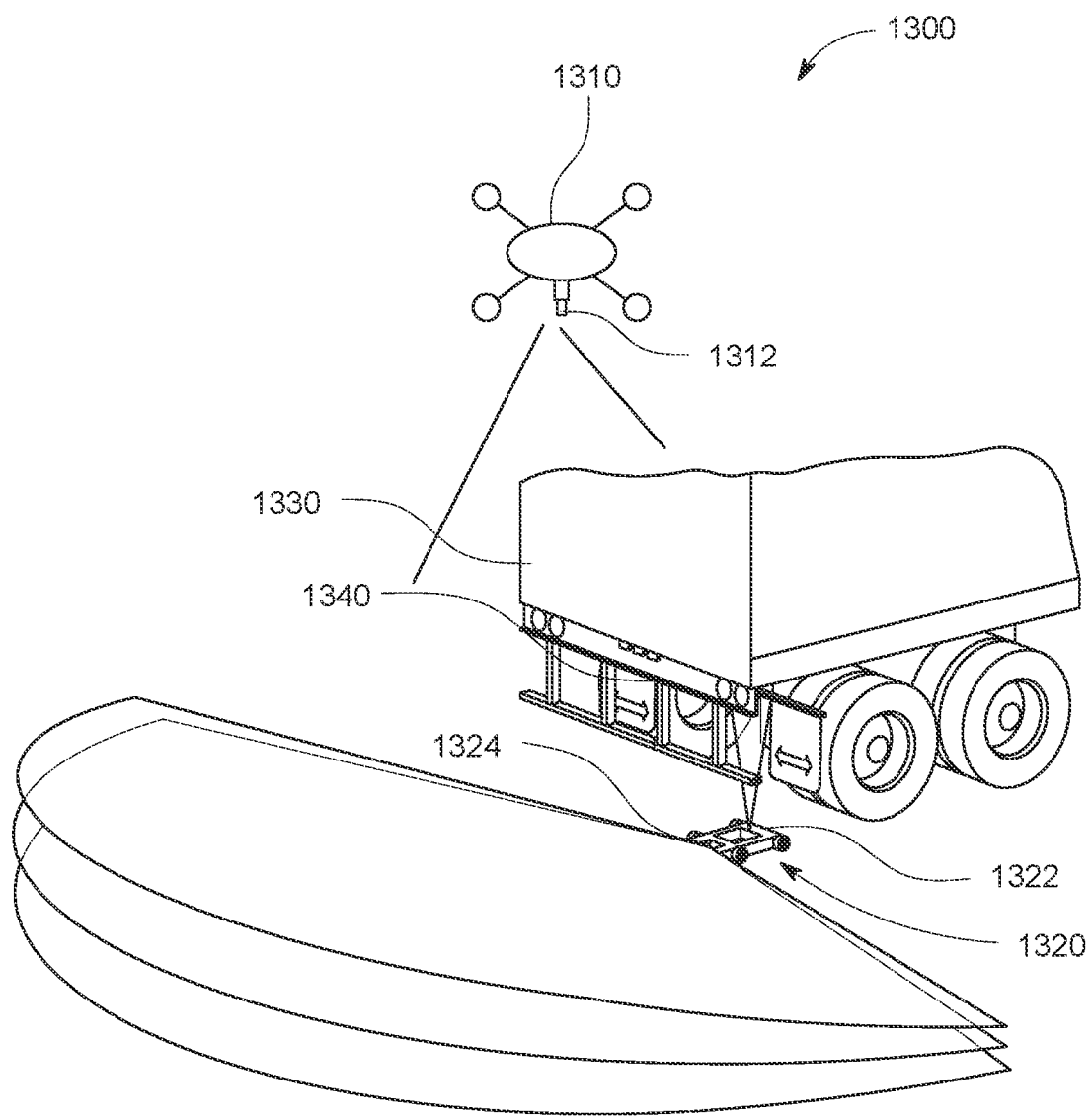
FIG. 13 is a fragmentary perspective view of the rear of a trailer showing an unmanned aerial vehicle (UAV) and unmanned ground vehicle (UGV) under control of an autonomous truck and/or facility system server, scanning and imaging a rear area of the vehicle for use (e.g.) in reversing operations, according to an embodiment.

FIG. 13 shows an arrangement 1300 for enhancing reversing safety in an autonomous truck environment using an autonomous robot. In an embodiment of a detection and safety system an autonomous unmanned aerial vehicle (UAV) 1310 or unmanned ground vehicle (UGV)/Rover 1320 can be employed. This vehicle 1310, 1320, equipped with one, or any combination of the above-mentioned sensor equipment (e.g. camera/sensor 1312, cameras/sensors 1322, 1324), as well as being data linked to the yard truck's system and/or yard truck controller, can be deployed from the yard truck and either assist with vision from the air or ground. As described further below, such systems can also be deployed on the top of trailer to relay sensor data back to the yard truck's autonomous navigation system.

In the illustrative ground vehicle embodiment (FIG. 13), using on-board sensors, the UGV would position itself off of a predetermined marker (for example along the outside edge of driver's side trailer frame 1330), and by communicating with the yard truck system server, the UGV can autonomously maneuver with trailer movements and augment the AV yard truck's vision/sensor system with the use of its own vision/sensor system during reversing and trailer positioning. As shown, sensors 1322 can look up at the truck's frame to determine and guide based upon its extents. It can move rearward as the truck backs up by tracking the rear edge 1340 of the trailer. UGV sensors 1324 can look rearwardly and determine the presence of obstructions or other hazards, such as vehicles/persons moving into and out of the trailer's path. This can operate in a manner similar to the backup systems found on most modern automobiles.

Figure 14:
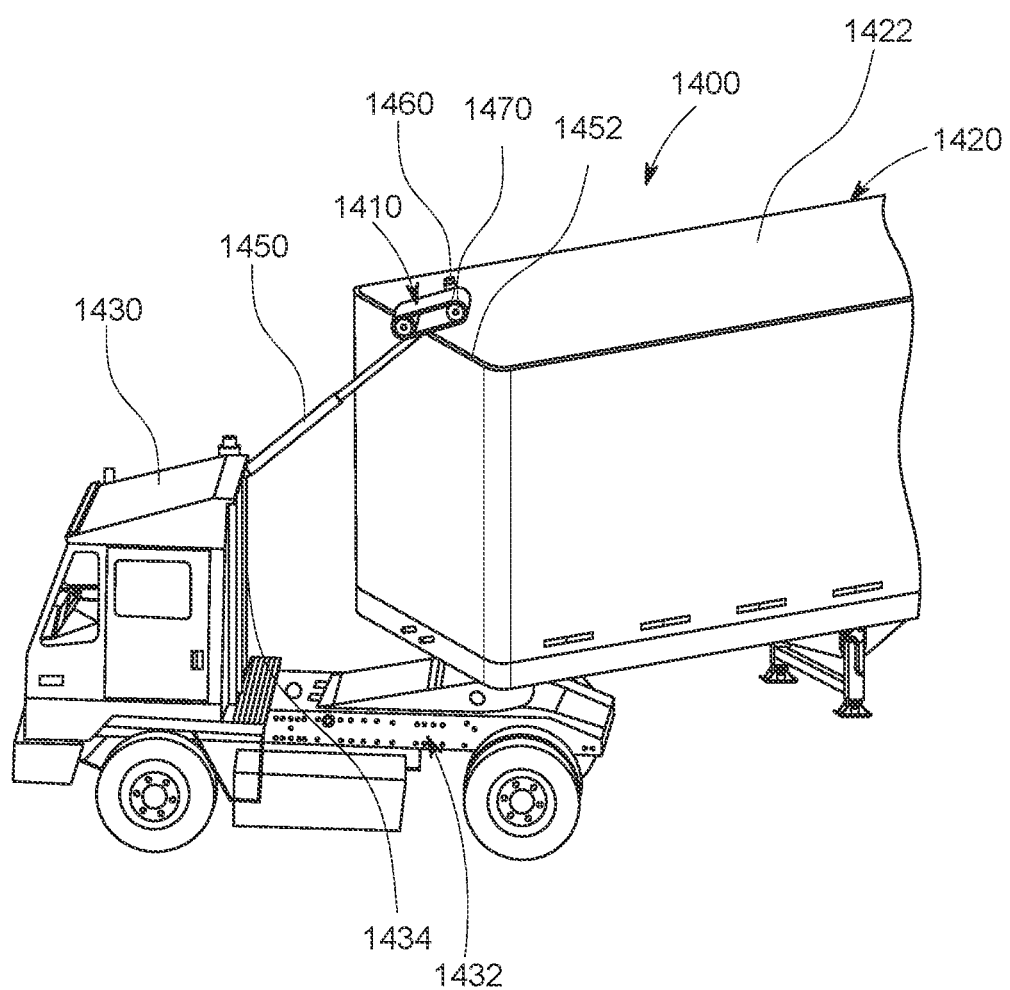
FIG. 14 is a fragmentary perspective view of an autonomous truck and trailer hitched thereto showing a deployment mechanism and associated UGV engaging the front end of the trailer roof, according to an embodiment.
Figure 15:
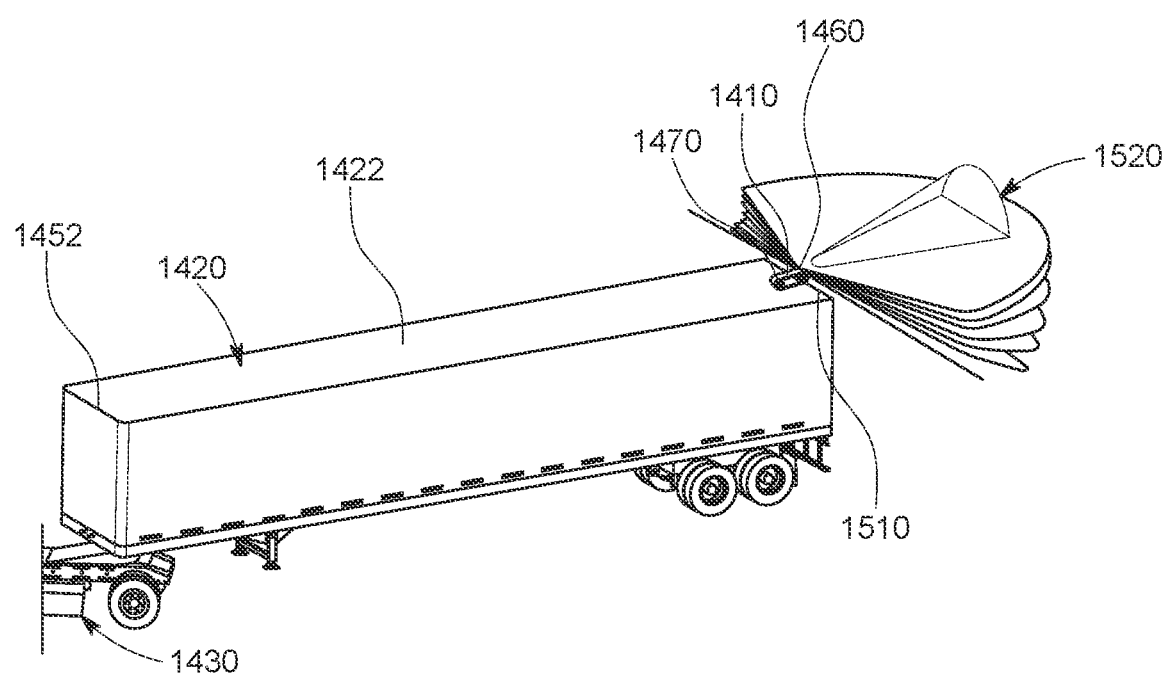
FIG. 15 is a fragmentary perspective view of the trailer and UGV of FIG. 14 showing the UGV acquiring sensor data from the rear of the trailer roof.

FIGS. 14 and 15 show an arrangement 1400 in which a UGV 1410 is deployed onto the roof 1422 of a trailer/container 1420 from the yard truck 1430 (where it is stowed as a non-interfering location on the chassis 1432 and/or cab 1434 when not in use) via a mechanical lifting system 1450 (ex. boom, arm, etc.). The lifting system can be extended and retracted as appropriate during the truck's movement. Using its sensors, the UGV determines the edges of the trailer/container roof 1422 and drives down the (e.g.) centerline from the front 1452 to the back 1510 (FIG. 15) of the trailer 1420. Upon sensing the rear edge of the roof 1422, the UGV 1410 locks its tires/tracks 1470, and provides rear vision/sensing and/or lighting in appropriate wavelength(s) 1520, using appropriate sensors 1460. The tires or tracks should provide sufficient holding friction to prevent slippage of the UGV during trailer motion. In various embodiments, the UGV can include a tether that extends from the truck cab for safety and/or to transmit data/power between the cab and the UGV.

Once the trailer has been successfully parked, a signal is sent to the server/truck controller, instructing the UGV 1410 to retrace its path along the roof from the rear 1510 to the front 1452 of the trailer 1420. The server/truck controller instructs the lifting mechanism 1450 to engage and retrieve the UGV 1410 and stow it back on the yard truck 1430.

Another embodiment of the deployment of a sensor system to the rear of an attached trailer is through the use of either a telescoping or scissoring boom (not shown), affixed to the yard truck, which would be capable of delivering a self-contained vision/sensor device, with an integrated lighting system for safety, to the rear of the trailer.

Another embodiment (not shown) includes a control routine that directs the yard truck to rear of the trailer, prior to connection, and uses an onboard delivery mechanism to temporary fasten a sensor system mounted on a deployment mechanism on the truck to the rear of the trailer using appropriate clamps, magnetic fixing units, etc.

Another embodiment (not shown) employs a robotic arm mounted on the truck, which is outfitted with a sensor package to peer around the trailer edge during backup. The robotic arm can communicate any sensor data back to the yard truck.

Figure 6:
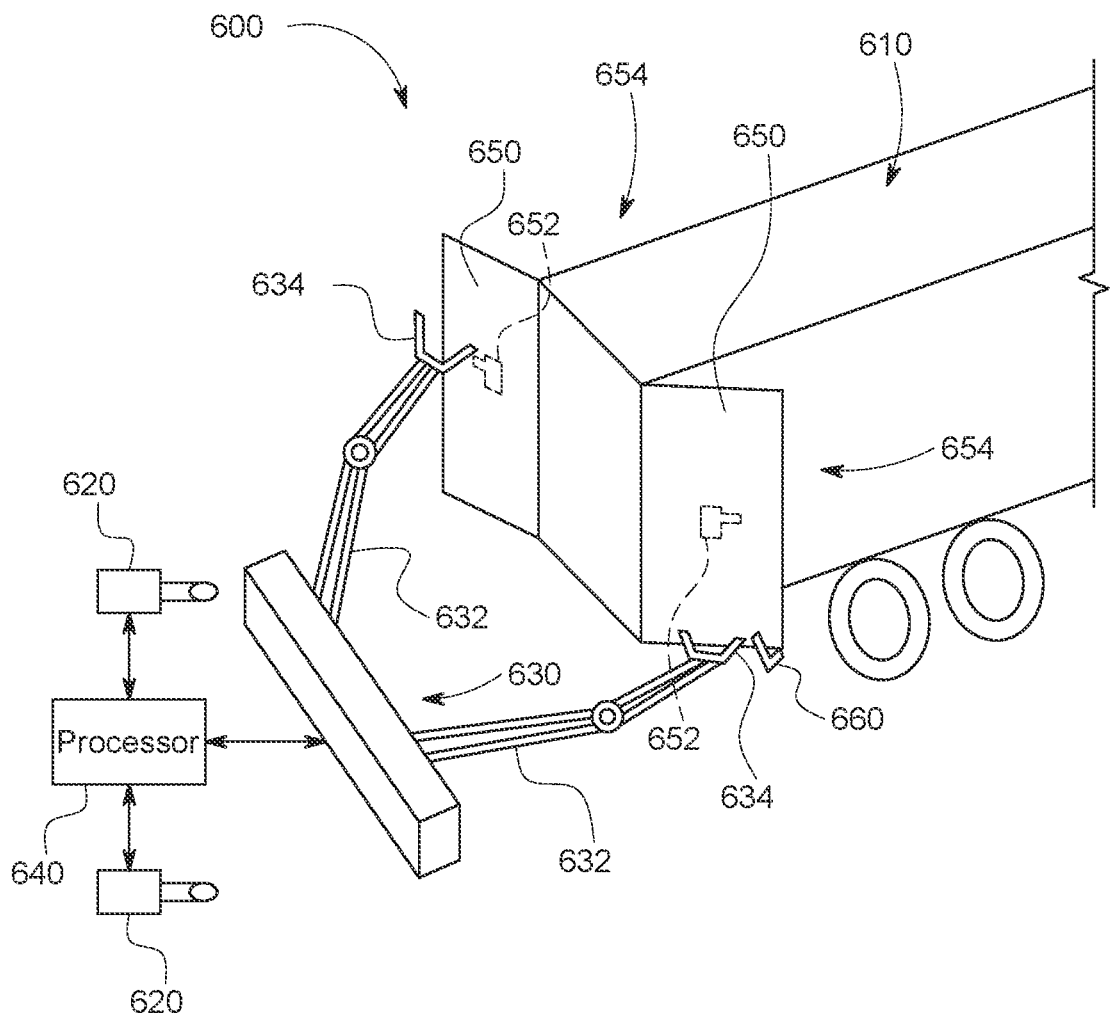
FIG. 6 is a diagram of door station for use in opening/closing trailer doors for use in the loading/unloading process within the yard environment.
Figure 6A:
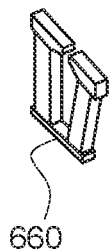
FIG. 6A is a diagram of a stand-alone clamping mechanism for the multi-arm robot of FIG. 6.

Yet another embodiment (not shown) integrates a deployable sensor system to the back of a trailer while the trailer is positioned at a door opening station (as described generally in Section II and FIG. 6 above).

1. Facility Arrangements

In another embodiment, the yard or facility site is instrumented with sensing devices, including a vision system camera and other sensing modalities (e.g. radar, LIDAR, laser range finds, etc.) instead (or in addition to) the trailer. Cameras and sensors can be mounted in a static configuration with coverage for each potential location that requires reversing of the trailer as part of the operation. As with the trailer-mounted systems, these sensors require communication to relay sensor data to the yard truck's autonomous navigation system.

Figure 16:
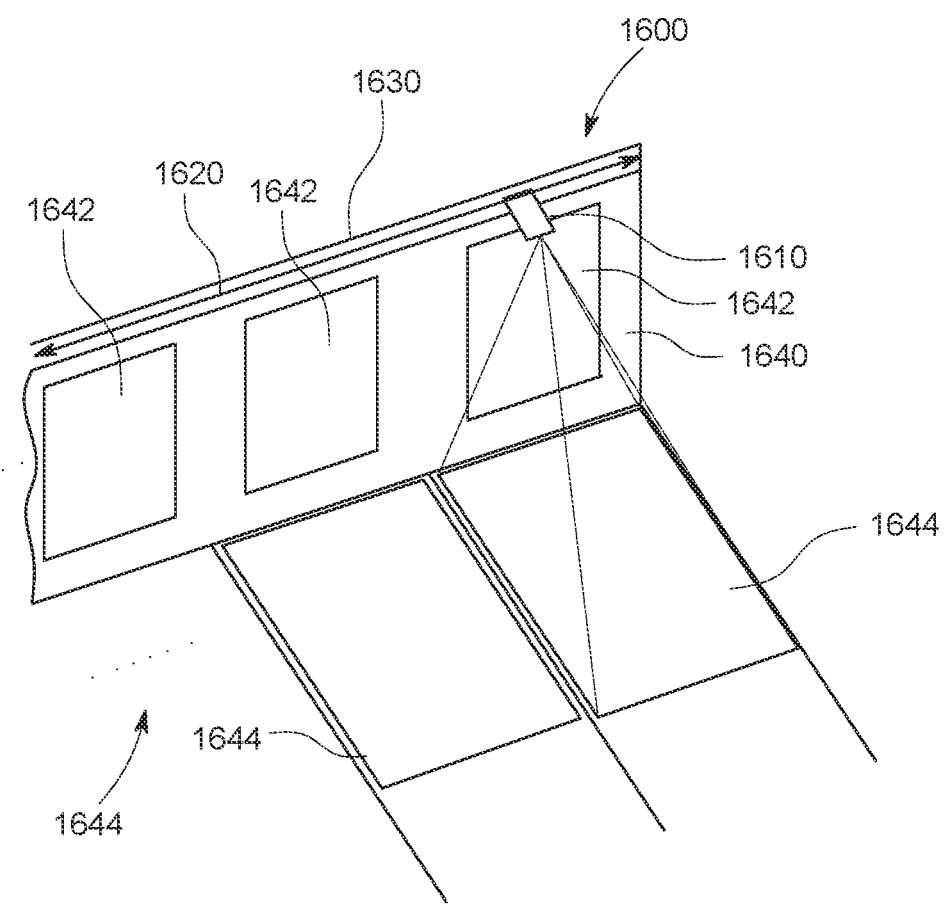
FIG. 16 is a fragmentary perspective view of a facility-mounted moving sensing system for providing images of the rear of a trailer, typically towed by an autonomous truck, according to an embodiment.

By way of non-limiting example, reference is made to FIG. 16, which shows a facility 1600 that includes site-mounted sensing, including sensors 1610 capable of side-to-side motion (arrow 1620) between potential reversing locations, for example by movement along a wire or rail 1630 attached to the side of a building 1640 (e.g. a loading dock with a series of bay doors 1642) to cover the "blind-spot" regions 1644. The exemplary sensor assembly 1610 is interfaced with a (e.g. wireless) communication system that relays sensor data to the yard truck's autonomous navigation system or system server. The sensor can be adapted to respond to an arriving or departing truck and move into its region to cover its operations. If a plurality of trucks are expected to move in relatively close time intervals to each other, then a plurality of sensors can be provided on one or more rails, wires, etc. In an embodiment, these moving sensor assemblies' sensors can be adapted to move independently from the site infrastructure, resulting in the UAV or UGV implementation described above.

Note that additional site-mounted sensing operations can be provided in embodiments, which can include ground-mounted radar or LIDAR sensors and/or cameras that can be adapted to detect non-truck movement in the yard, and report such to the system server. This can be used for safety and security, tracking potential hazards and obstructions, as well as persons moving around the yard who may be at risk for injury from moving vehicles.

In embodiments, the operation of an auxiliary trailer jackstand can be automated and augmented based upon data and instructions from the yard tuck and/or system server. Currently, separate jackstands are sometimes employed in distribution centers and production facilities, to prevent a collapse of a trailer due to trailer landing gear failure. This current method requires a driver or ground personnel to locate and properly position (and then later retract and stow) a jackstand under the front of the trailer each time it is unhitched from the truck.

C. Automated Jackstands

Figure 17:
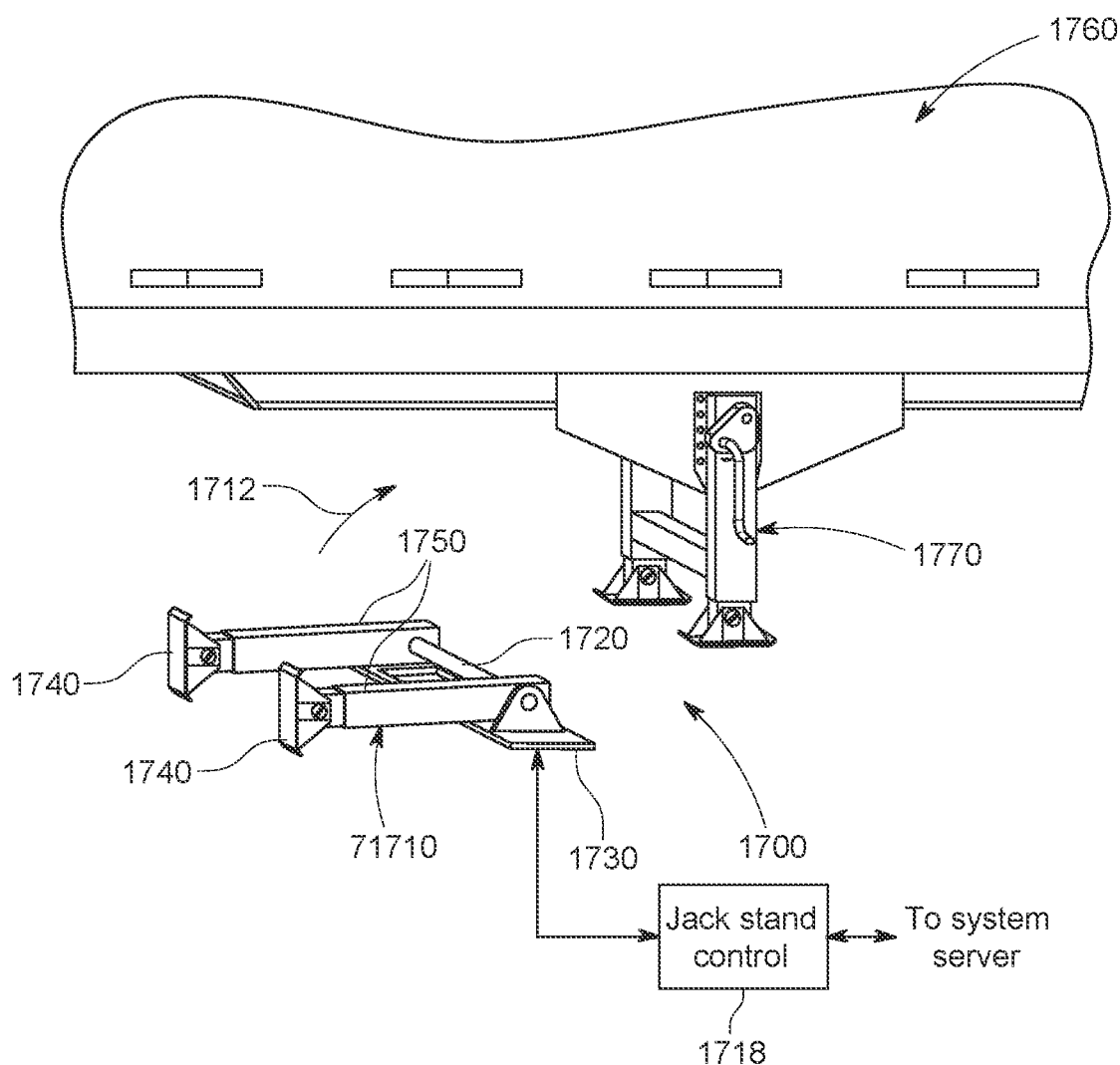
FIG. 17 is a fragmentary perspective view of a trailer and associated landing gear located adjacent to an automatically deploying jack stand, shown in a retracted position, flush to the ground, according to an embodiment.
Figure 18:
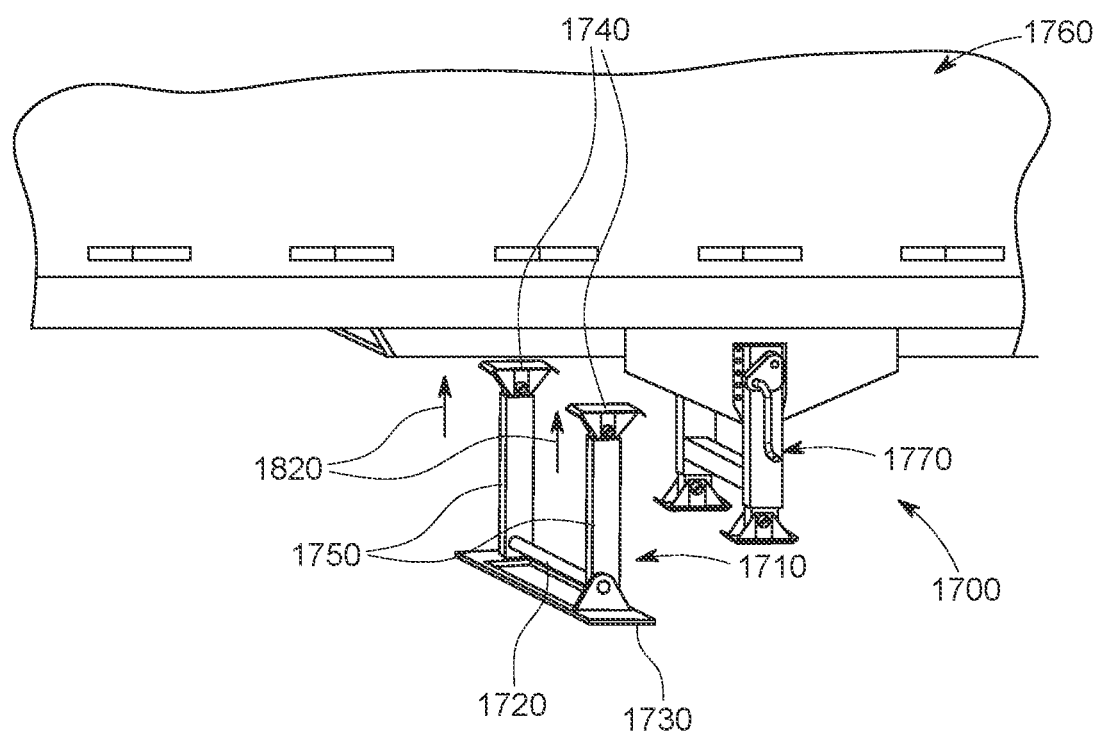
FIG. 18 is a fragmentary perspective view of the trailer and associated landing gear located adjacent to the automatically deploying jack stand of FIG. 17, shown in a deployed position with pads confronting the bottom of the trailer.
Figure 19:
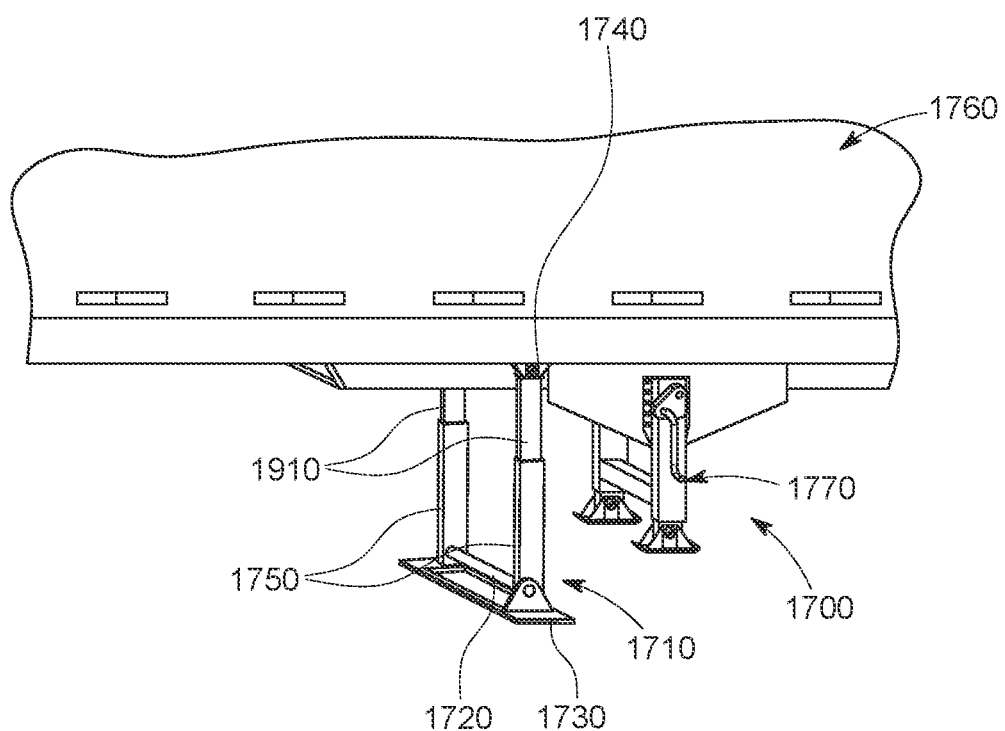
FIG. 19 is a fragmentary perspective view of the trailer and associated landing gear located adjacent to the automatically deploying jack stand of FIG. 17, shown in an engaged position with pads bearing against, and supporting the bottom of the trailer.

FIGS. 17-19 show an automated jackstand arrangement 1700 in which the trailer jackstand is pivotally movable between a flush position against the ground (FIG. 17) and an auto-deployed position, in which it pivots (curved arrow 1712, about pivot axle 1720) on its base 1730. In this upright, deployed position (FIG. 18), the jack pads 1740 on spaced apart jack legs 1750 confront the bottom of the trailer 1760. The pads 1740 are then moved upwardly (arrows 1820) on telescoping members 1910 of the legs 1750 until they pressurably engage the bottom of the trailer 1760. Hydraulic or pneumatic pistons can be used to drive the telescoping members 1910. Likewise, a hydraulic, pneumatic or electromechanical system, with appropriate locking device(s), can be used to pivot the jackstand from a grounded orientation (FIG. 17) to a deployed orientation (FIGS. 18 and 19). The engagement of the jackstand pads 1740 with the bottom of the trailer 1760, provides further support for the landing gear 1770, as well as the added benefit of securing the trailer against skidding away from the loading bay in the manner of wheel chocks. The automated jackstand can either be permanently anchored to the ground for specific length trailers, or alternately, or can be mounted on a sliding track that rides beneath the trailer, thereby allowing flexibility of variable trailer lengths, communicated via yard management system or automated yard truck system to a jackstand controller 1718, which also controls pivoting deployment.

D. Automated Chocking

From a safety standpoint many operations choose to place wheel chocks in front of a trailer's tires when the trailer is being loaded or unloaded at a facility dock/loading bay. This is due to the historical precedence of the trailer separating away from a dock, typically when it is being loaded or unloaded with the assistance of a vehicle, such as a forklift. The gap left between the trailer and dock can lead to serious injury or death from impingement should the trailer suddenly lurch forward or backward.

Figure 20:
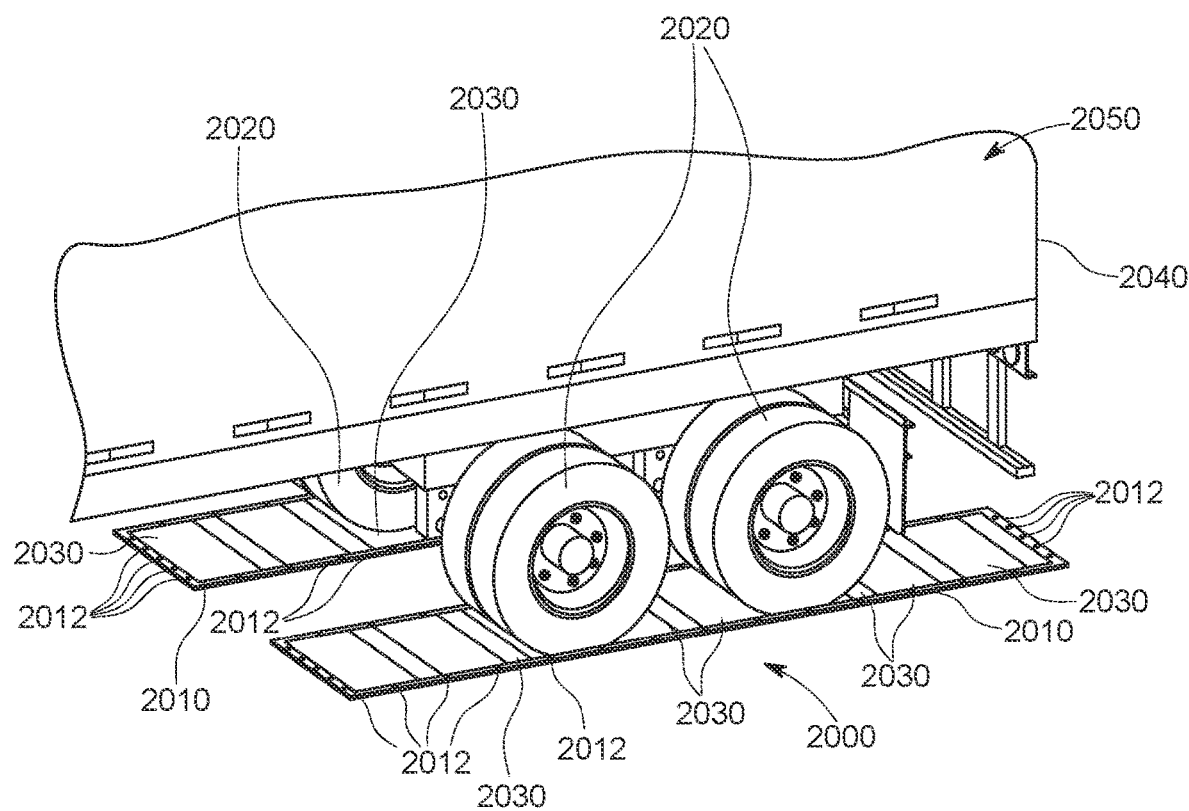
FIG. 20 is a fragmentary perspective view of a trailer and associated wheel set parked on an inflatable, sawtooth-shaped automated chocking pad, shown in a deflated, un-deployed condition, according to an embodiment.
Figure 21:
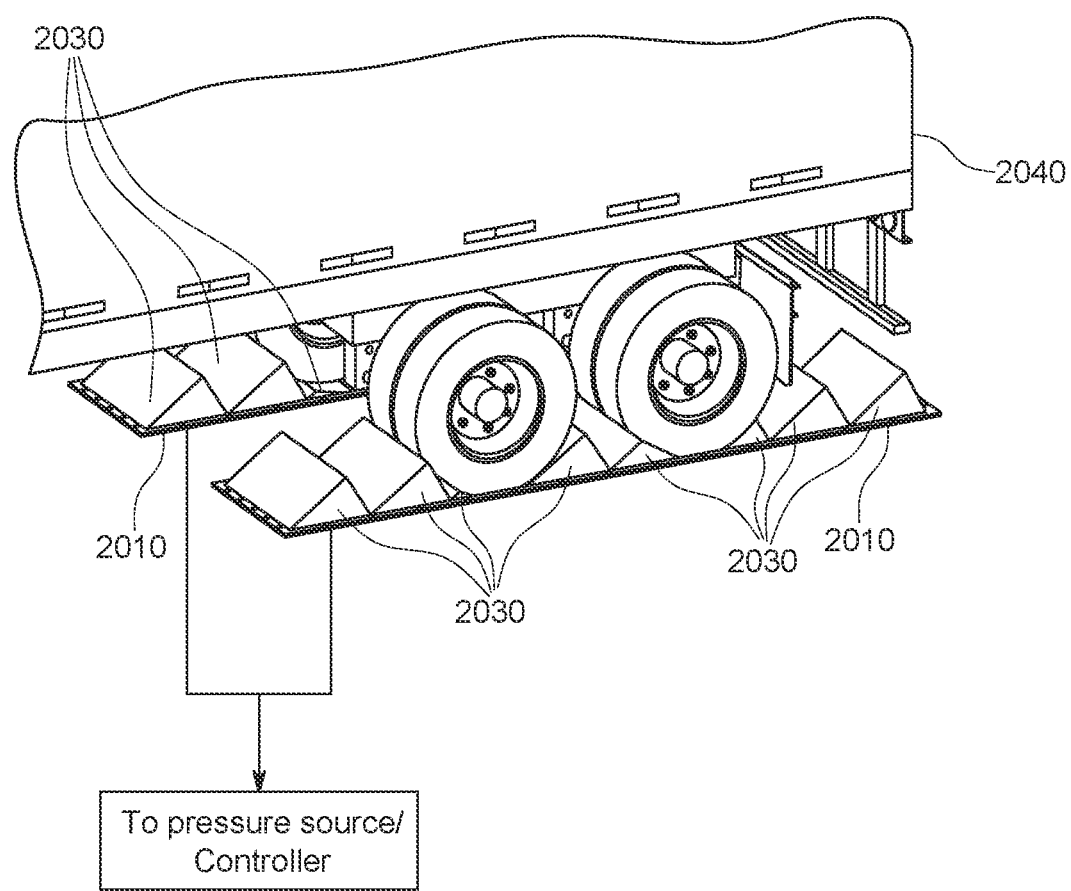
FIG. 21 is a fragmentary perspective view of the trailer and associated wheel set of FIG. 20 in which the automated chocking pad is in an inflated, deployed condition with sawteeth engaging and restraining the wheel sets against motion.

An automated chocking system 2000, according to an embodiment is shown in FIGS. 20 and 21. The system comprises a baseplate tray 2010, located under each trailer wheel set 2020, which can be bolted 2012 (or otherwise secured firmly) to the ground. The tray 2010 retains a plurality (e.g. eight) in-line air bladders 2030 made from high-density rubber, or a similarly behaving compound (e.g. a reinforced fabric), that are wear and tear resistant to the effects of trailer wheels when deflated (FIG. 20). Once the trailer tires pull onto the tray 2010 and are properly positioned (e.g. rear 2040 of trailer 2050 positioned against bay door for loading/unloading), a switch can be manually thrown, or automatically triggered, that will open an air valve (pressure source) for a specific loading bay, for example, originating from a centrally located air compressor that services multiple docks. The opening of the air valve will start the inflation of the air bladders that are not compressed by the weight of the trailer tires (see FIG. 21). The air bladders assume a sawtooth side cross section (each tooth defining an individual triangular side cross section. Hence the surrounding teeth serve to capture the wheels and prevent forward or rearward rolling motion. Once the loading or unloading of the trailer has been completed, an operator in the facility can either throw a switch that will automatically deflate the bladders (returning them to the flattened configuration of FIG. 20), or provide a signal to the autonomous vehicle system, that can remotely activate the deflation mechanism. The dimensions of each triangular tooth are highly variable. In general, they should be sized and arranged to provide a cradling ramp on each side of a wheel set with no more than one tooth compressed therebetween.

Figure 22:
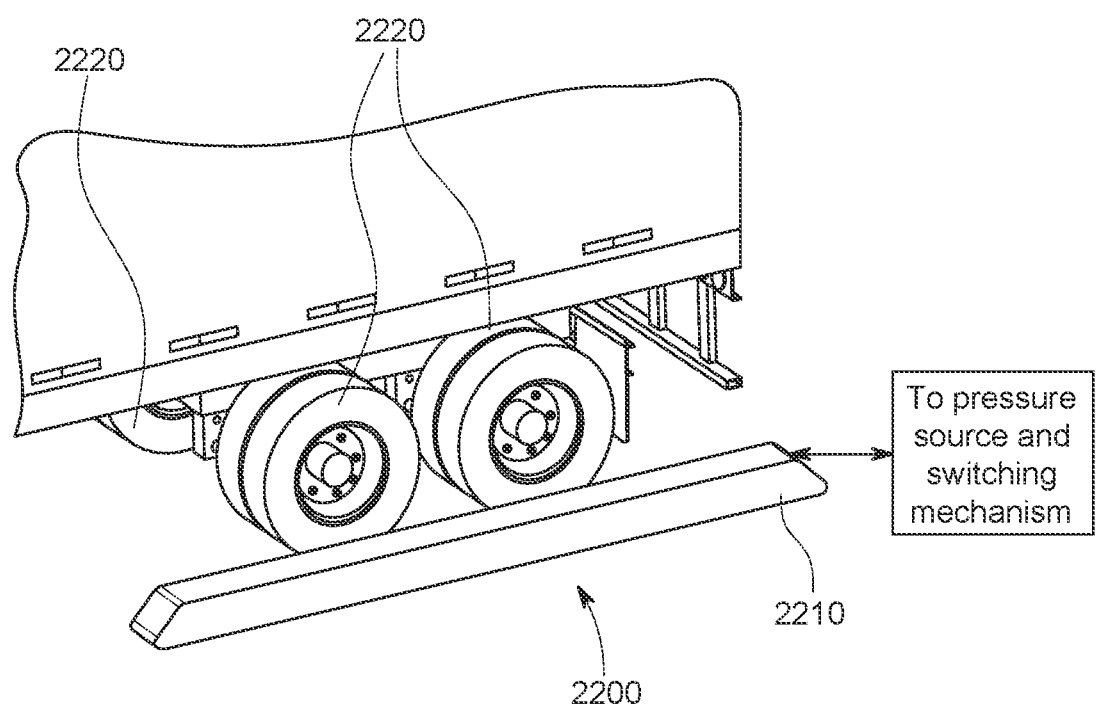
FIG. 22 is a fragmentary perspective view of a trailer and associated wheel set parked adjacent to a manifold that deploys a plurality of inwardly extending, inflatable tubes to provide an automated chocking assembly, shown in a deflated, un-deployed condition, according to an embodiment.
Figure 23:
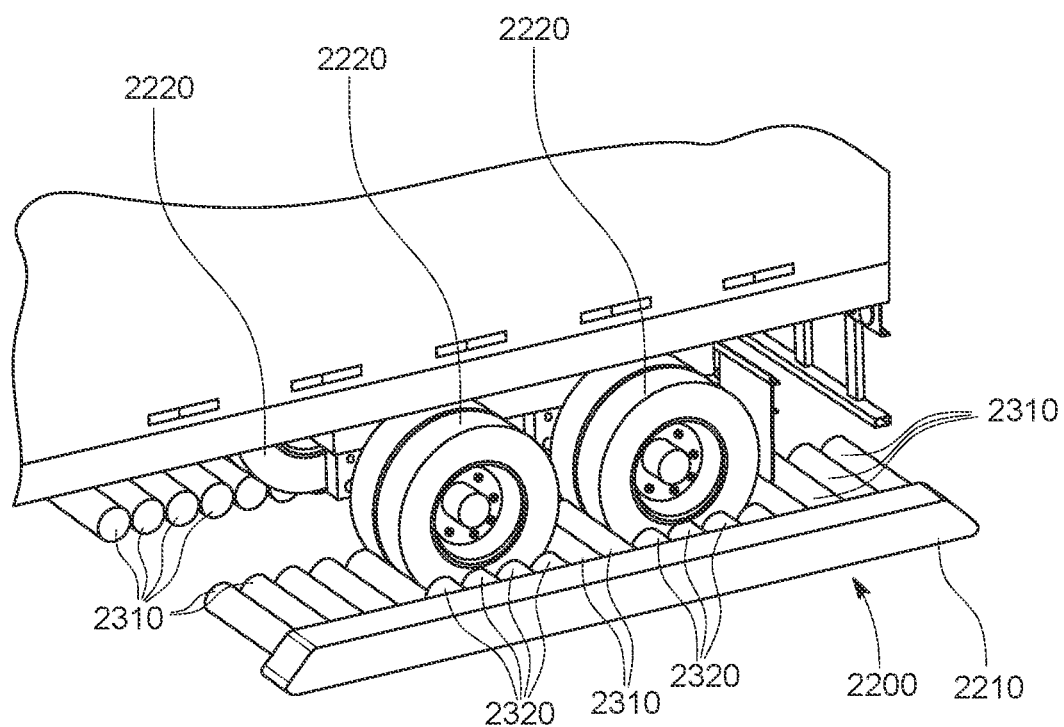
FIG. 23 is a fragmentary perspective view of the trailer and associated wheel set of FIG. 22 in which the automated chocking assembly is in an inflated, deployed condition with tubes engaging and restraining the wheel sets against motion.

FIGS. 22 and 23 show an inflatable automated chocking system 2200 according to an embodiment. It consists of a pair of rigid framed and hard mounted air manifolds 2210, each located adjacent to the outside of the trailer tires 2220. Along the length of the manifold 2210 there is a row of independent tubes that can be inflated once the trailer is in position against the loading bay, as shown. Once triggered to inflate, all tubes 2310 that are not obstructed (by tires 2220) rigidly fill with air and surround the tires, preventing them from rolling as shown in FIG. 23. Tubes 2320 that are partly or fully obstructed by the tires 2220 do not fill completely (as shown in FIG. 23). These tubes can resist complete inflation based upon a safety valve in each tube pneumatic circuit that senses resistance to pressurization or based upon the degree of pressure applied to the tube being insufficient to overcome the resistance posed by the sidewall of the trailer tire. Upon deflation, pressurized air is extracted from the tubes 2310, and the tubes retract out of the path of the departing trailer. A suction source can be employed to ensure full retraction into the manifold 2210. Alternatively, the tubes can include an elastic material or an internal expansion spring (metal or polymer) that forces retraction when air pressure is released. The degree of pressure used to inflate the tubes, as well as the material thickness and durability is chosen to ensure that the trailer remains stationary when inflated. The cylindrical diameter of the tubes can be approximately several inches to a foot and the length can be approximately the same as or greater than the width of at least one (and generally both) tires in a wheel set 2220.

Figure 24:
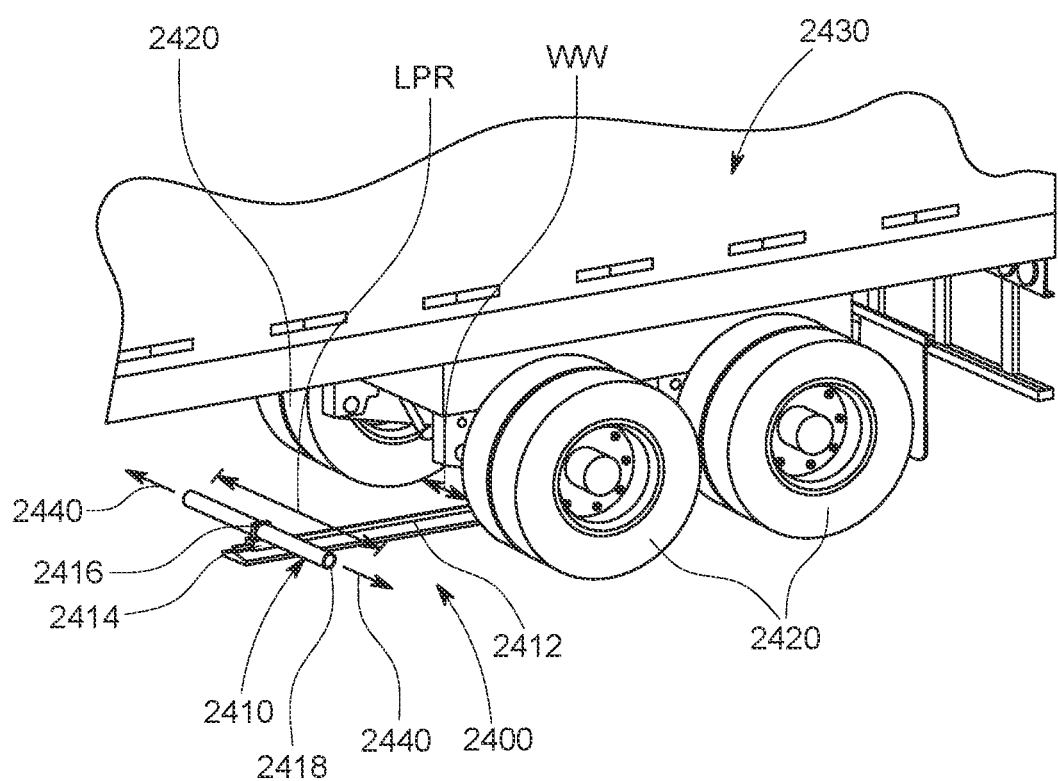
FIG. 24 is a fragmentary perspective view of a trailer and associated wheel set parked on an automated chocking assembly that uses a centerline track with a sliding, transverse pipe/bar having retractable, opposing retractable pipe/bar extensions, shown in an un-deployed condition, according to an embodiment.
Figure 25:
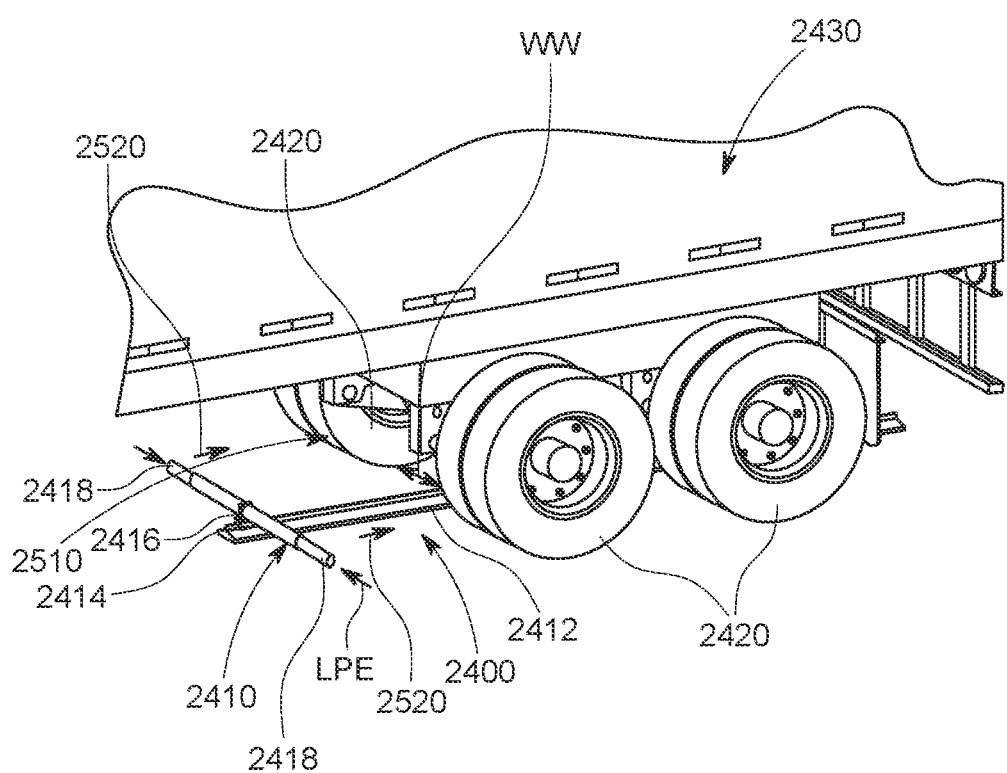
FIG. 25 is a fragmentary perspective view of the trailer and associated wheel set, with the opposing pipe/bar extensions of the automated chocking assembly of FIG. 24 in an extended, deployed condition, prepared to engage the wheel sets.
Figure 26:
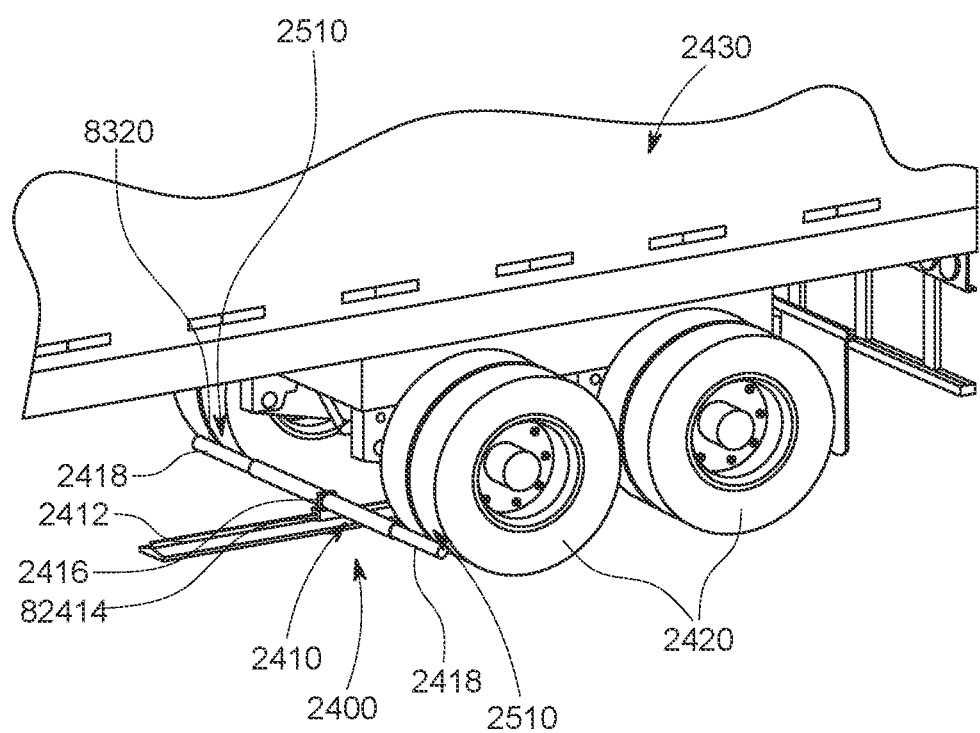
FIG. 26 is a fragmentary perspective view of the trailer and associated wheel set, with the deployed pipe/bar extensions of the automated chocking assembly of FIG. 24 slid into engagement with the wheel set to restrain it against motion.

Another automated chocking arrangement 2400 is shown in FIGS. 24-26, according to an embodiment. The arrangement 2400 consists of a high-strength (e.g. a strong metal/metal alloy) telescoping pipe 2410 that is center-mounted on a track 2412. The track 2412 is secured to the parking pad between the wheel sets 2420 of the trailer 2430 using bolts or other fastening mechanisms. Pipe 2410 is mounted on a slider 2414 with a base 2416. The slider 2414 moves along the track 2412 under operation of a robust actuator—for example hydraulic motor/piston and/or geared electric motors (e.g. a rack and pinion for linear motion).

As shown, in operation, the trailer 2430 is moved into position with respect to the dock or other parking area. The length LPR is less than the width WW between wheels so that the wheels can pass over the pipe 2410 free of interference. As shown in FIG. 25, once parked, a sensing system senses the presence of the truck and/or an operator presses a switch that causes the inner telescoping ends 2418 of the pipe to extend outwardly (arrows 2440) in opposite directions so that the overall pipe 2410 defines a length LPE greater than inner wheel width WW. The telescoping sections extend using a linear actuator, such as a hydraulic piston that can be implemented according to known skill. The piston can be embedded in the center pipe section. The ends 2418 can be retracted by a reversing hydraulic pressure or a resistive spring force that operates when the extension pressure is removed. When either a sensor or the operator determines the parked location of the wheel fronts 2520, the slider 2414 is moved (arrows 2520) to slide along a track 2412 for some length along the trailer until the ends 2418 engage the wheel fronts 2510, as shown in FIG. 26. The ability to slide along the track to differing positions allows the pipe 2410 to compensate for a wide range of possible trailer axle positions). The slider motion mechanism can include a sensor that detects when resistance is encountered as the sliding pipe engages the stationary trailer tires 2420. Additionally, the slider motion mechanism can include locking components (not shown) that further secure the slider to its desired location along the track. The holding force of the slider motor can also suffice as a sufficient resistance mechanism depending upon its design.

When the trailer 2430 is again ready for motion, the operator or the system server directs the pipe ends 2418 to retract and the slider 2414 to move back to a forward waiting position. The trailer wheels 2420 are then free to pass over the arrangement 2400.

Figure 27:
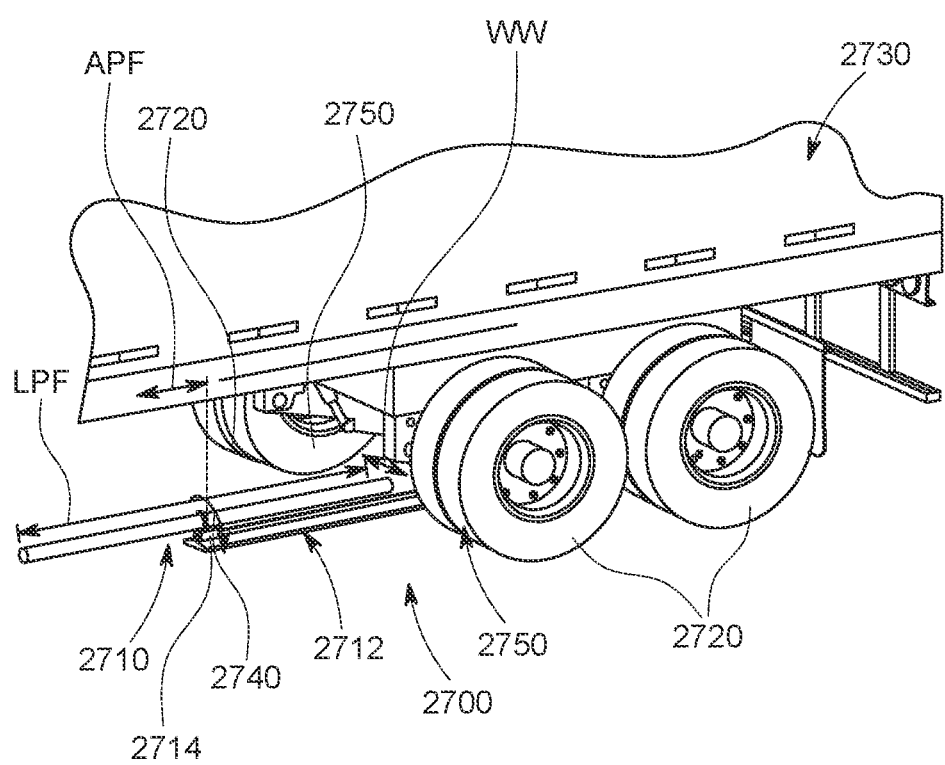
FIG. 27 is a fragmentary perspective view of a trailer and associated wheel set parked on automated chocking assembly that uses a centerline track with a sliding, transverse pipe/bar having a pivot mechanism on the slider to rotate the bar between an un-deployed orientation, parallel to the track, and a deployed orientation transverse to the track, shown in the un-deployed orientation, according to an embodiment.
Figure 28:
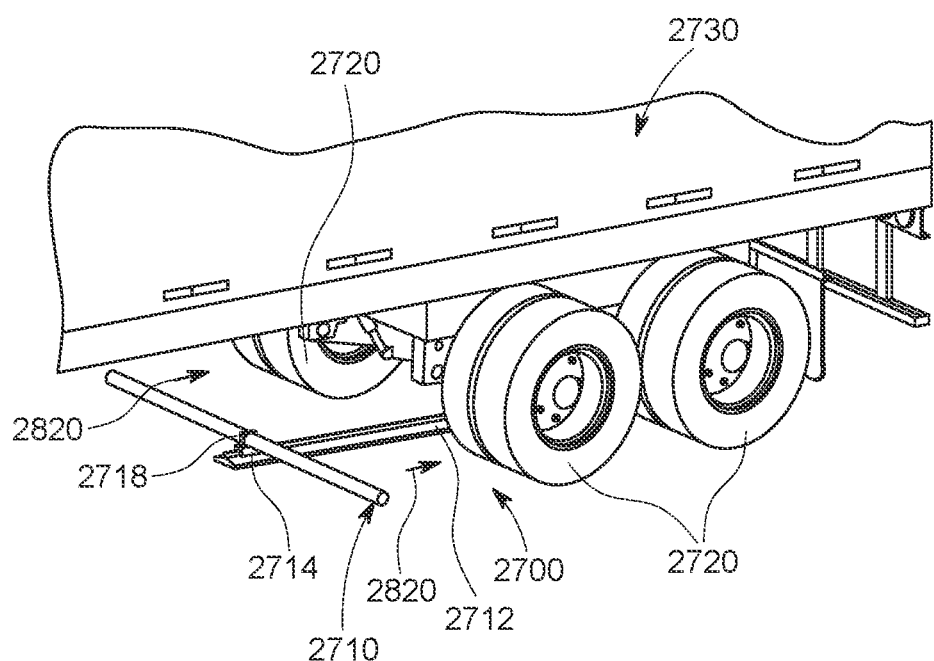
FIG. 28 is a fragmentary perspective view of the trailer and associated wheel set, with the pipe/bar of the automated chocking assembly of FIG. 27 in a rotated, deployed orientation, prepared to engage the wheel sets.
Figure 29:
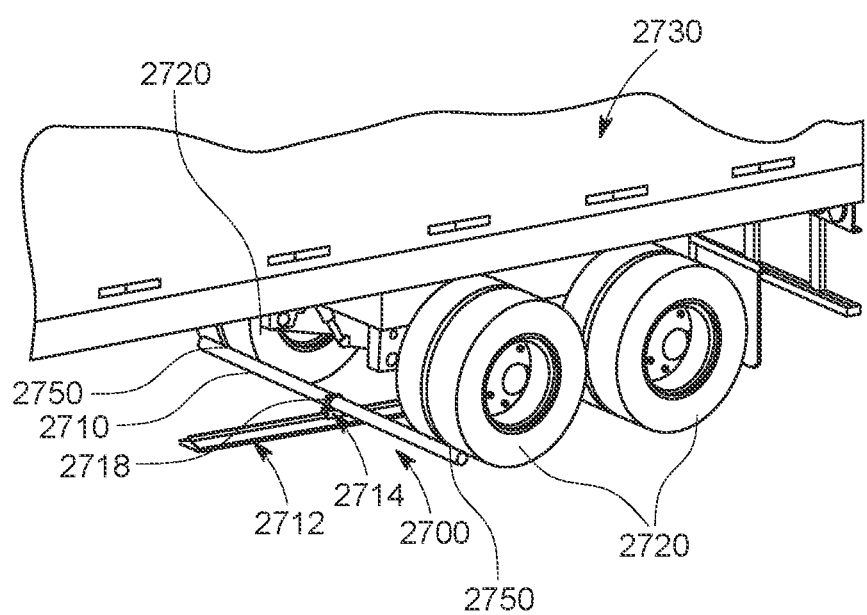
FIG. 29 is a fragmentary perspective view of the trailer and associated wheel set, with the deployed pipe/bar of the automated chocking assembly of FIG. 28 slid into engagement with the wheel set to restrain it against motion.

A similar automated chocking arrangement 2700 to the arrangement 2400 described above in reference to FIGS. 24 to 26 is shown in FIGS. 27 to 29. Thus, similarly functioning elements can be assumed to operate similarly. In this embodiment, a fixed pipe 2710 is provided on a slider 2714 that moves along a fixed track 2712 as described above. In this embodiment, the pipe 2710 is a fixed unit with an overall length LPF that is greater than the inner width WW of the wheels. The slider includes a powered pivot 2718 that allows the pipe 2710 to rotate about a vertical axis APF. Thus, as shown, pipe can normally stow itself lengthwise (parallel) to the trailer 2730, allowing the wheels to back through it to the parking space. The slider 2714 is sufficiently far forward of the wheel fronts 2750 in this orientation to then allow the pivot 2718 to rotate (curved arrow 2740) the pipe 2710 by 90 degrees into its deployed position, as shown in FIG. 28. In this position, the pipe 2710 extends in opposing directions sufficiently to engage the wheel fronts 2750. The system is then directed by a sensor and/or the operator to move the slider 2714 and associated pipe 2710 rearwardly (arrows 2820) into engagement with the wheel fronts 2750, as shown in FIG. 29. The trailer 2730 is now safely chocked for loading or unloading.

When the trailer 2730 is again ready for motion, the operator or the system server directs the slider 2714 to move to a forward waiting position and rotate the pipe pivot 2718 to place the pipe 2710 parallel to the track 2712. The trailer wheels 2720 are then free to pass over the arrangement 2700.

The power of the pivot motor and its locking ability may be reduced as the wheels tend to bear evenly on both sides of the pipe. In general, in the arrangements 2400 and 2700, the cross section of the pipe can be any acceptable regular or irregular shape—for example, circular as depicted, polygonal or a combination of polygonal and curvilinear shapes. In an embodiment, the front, wheel-engaging surface of the pipe can be shaped with an angled flat face similar to a conventional wheel chock so as to enhance its retaining ability.

V. Conclusion

It should be clear that the above-described system and method of handling and managing trailers within a shipping yard and the associated devices and operational techniques for autonomous AV yard trucks provides an effective way to reduce human intervention, thereby lowering costs, potentially increasing safety and reducing downtime. The systems and methods herein are practically applicable to a wide range of both electric and fuel-powered trucks and any commercially available trailer arrangement. More particularly, the systems and methods herein effectively enable automation of critical yard operations, such as unlatching and opening of trailer doors, navigation and docking of trailers with loading bays and docks, and other aspects of autonomous vehicle operation. Such systems also enhance operations in container yards, and in other busy yard environments where reverse direction may be a concern and ensuring safety of parked vehicles is a consideration. These novel systems, methods and operations, while adapted to use on AV yard trucks can also benefit other types of automated transport vehicles, and it is contemplated that, using skill in the art, such can be extended to a wide range of non-yard-based and/or OTR vehicles.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Also, qualifying terms such as "substantially" and "approximately" are contemplated to allow fort a reasonable variation from a stated measurement or value can be employed in a manner that the element remains functional as contemplated herein—for example, 1-5 percent variation. Accordingly, this description is meant to be taken only by way of example, and not to otherwise limit the scope of this invention.

What is claimed is:

1. A device for robotically opening rear swing doors of a trailer comprising:
   a frame adapted to receive, adjacent thereto, trailer rear
   a member on the frame that moves in a plurality of degrees of freedom in relation to the frame and trailer, and includes structures that are arranged to manipulate a door securing assembly on the trailer;
   a door opening assembly that engages and swings the doors subsequent to unlocking;
   an interface that guides the frame and the door opening assembly remotely; and
   a door-fixing assembly that retains each door in an open orientation after the trailer moves remote from the frame.

2. The device as set forth in claim 1, wherein the door opening assembly comprises at least one of a robotic arm assembly and a post assembly that move approximately vertically into and out of engagement with each of the doors and moves along a path from a closed position and the open orientation.

3. The device as set forth in claim 2, wherein the posts are movably mounted with respect to a slotted floor that allows each of the posts to track along a respective slot, defining the path.

4. The device as set forth in claim 1, wherein the door-fixing assembly comprises an end effector, operatively connected with the frame, that selectively applies a clip or clamp-like device over the door and a side of the trailer via a rear edge thereof in the open orientation.

5. The device as set forth in claim 1, wherein the interface comprises a sensor assembly that views the rear of the trailer and a processor that causes the frame to move in response to control commands.

6. The device as set forth in claim 5, wherein the processor includes at least one of (a) a human-machine-interface (HMI) control that allows a user to move the frame based on feedback received from the sensor assembly, and (b) an autonomous movement process that automatically moves the frame based on a trained pattern in response to the sensor assembly.

7. The device as set forth in claim 6, wherein the sensor assembly comprises a camera assembly and the autonomous movement process includes a vision system.

8. The device as set forth in claim 1, wherein the door-fixing assembly includes a clip-like clamping device constructed and arranged to flex and frictionally pinch each door in an open orientation against a side of the trailer, the clamping device residing over a rear edge of the swing door and the side.

9. The device as set forth in claim 8, wherein the clamping device defines a pair of tines with a gap therebetween joined by a connecting base.

10. The device as set forth in claim 9, wherein the clamping device is adapted to be slid robotically or manually over the rear edge.

11. The device as set forth in claim 10, wherein the connecting base includes a structure that is selectively engaged by an end effector of a robot.

12. The device as set forth in claim 11, wherein the clamping device comprises a flexible material and defines a unitary construction between the tines and the connecting base.

13. The device as set forth in claim 8, wherein the door-fixing assembly includes a robotic end effector that selectively applies the clamping device over the door and the side via a rear edge thereof in the open orientation.

* * * * *